US008654676B2

(12) United States Patent
Foster

(10) Patent No.: US 8,654,676 B2
(45) Date of Patent: Feb. 18, 2014

(54) MODELLING APPARATUS AND METHOD

(75) Inventor: Gerard Terence Foster, Marston Meysey (GB)

(73) Assignee: TEOCO Corporation, Fairfax, VA (US)

( * ) Notice: Subject to any disclaimer, the term of this patent is extended or adjusted under 35 U.S.C. 154(b) by 118 days.

(21) Appl. No.: 13/262,827

(22) PCT Filed: Apr. 15, 2010

(86) PCT No.: PCT/GB2010/050628
§ 371 (c)(1),
(2), (4) Date: Nov. 30, 2011

(87) PCT Pub. No.: WO2010/119291
PCT Pub. Date: Oct. 21, 2010

(65) Prior Publication Data
US 2012/0093029 A1   Apr. 19, 2012

(30) Foreign Application Priority Data

Apr. 16, 2009   (GB) .................................. 0906591.3

(51) Int. Cl.
*H04L 12/28* (2006.01)
(52) U.S. Cl.
USPC .......................... 370/254; 370/395.53; 703/13
(58) Field of Classification Search
USPC ........ 370/252, 253, 254–258, 395.53; 703/13
See application file for complete search history.

(56) References Cited

U.S. PATENT DOCUMENTS

| 2003/0086405 A1* | 5/2003 | Silva et al. ..................... 370/342 |
| 2004/0032857 A1* | 2/2004 | Tannan ......................... 370/351 |
| 2007/0058607 A1 | 3/2007 | Mack-Crane et al. |

FOREIGN PATENT DOCUMENTS

| EP | 1496717 A2 | 1/2005 |
| WO | 9948306 A1 | 9/1999 |
| WO | WO03071751 A1 | 8/2003 |
| WO | 03094538 A1 | 11/2003 |
| WO | 2004002078 A1 | 12/2003 |
| WO | 2005060293 A1 | 6/2005 |

OTHER PUBLICATIONS

Yu Liu et al., "Genesis: A scalable distributed system for large-scale parallel network simulation", Computer Networks, www.elsevier.com/locate/comnet, pp. 2028-2053, Year: 2006.

(Continued)

*Primary Examiner* — Pao Sinkantarakorn
(74) *Attorney, Agent, or Firm* — Ralph P. Albrecht; ATFirm PLLC

(57) ABSTRACT

A method of processing a model of a telecommunications system including a plurality of access nodes through which communications terminals can communicate data is described. The method includes dividing the communications terminals, the access nodes and the core network into different groups, for a first of the groups loading the computer program code representing the communications terminals, the access nodes or the core network of the first group into the computer memory and performing the representing with the processor within a first time period, determining an amount of the data communicated between the first group and one or more of the other groups during the first time period, and for a subsequent time period representing the first group by an amount of data corresponding to the amount of the data communicated between the first group and a second of the groups, while loading the computer program code into the computer memory and performing the representing of the second group within the subsequent time period. The results produced by the modeling can be used to configure the telecommunications system itself.

9 Claims, 19 Drawing Sheets

(56) References Cited

OTHER PUBLICATIONS

Lokesh Bajaj et al., "GloMoSim: A Scalable Network Simulation Environment", XP-002589711, Computer Science Department, pp. 1-12, Year: 1999.

Donghua Xu et al., "BencHMAP: Benchmark-Based, Hardware and Model- Aware Partitioning for Parallel and Distributed Network Simulation", IEEE Computer Society's 12th Annual International Symposium on Modeling, Analysis, and Simulation of Computer and Telecommunications System, pp. 455-463, Year: 2004.

Hyunok Lee et al., "High-Fidelity and Time-Driven Simulation of Large Wireless Networks with Parallel Process", Modeling and Simulation: A Practical Guide for Network Designers and Developers, IEE Communications Magazine, Mar. 1, 2009, pp. 158-165.

Colle D. et al.,"Multilayer Traffic Engineering for GMPLS-Enabled Networks", IEEE Communications Magazine, Jul. 1, 2005, vol. 43, No. 7, pp. 44-50.

* cited by examiner

Cell Coverage Area = (pi) x (Cell Radius)^2

RNC Coverage Area = (# cells of this RNC) x (CellCoverage Area)
= (# cells of this RNC) x (pi) x (Cell Radius)^2

RNC Coverage Area = (pi) x (RNC Radius)^2 =>
RNC Radius = sqrt{(RNC Coverage Area) / (pi)}

MS - user webpages/voice calls, video calls
NS - Network Services e.g. TCP/IP connections, Addresses etc.
DEMAND - Bit rate

MODELLING APPARATUS AND METHOD

FIELD OF INVENTION

The present invention relates to methods of configuring a telecommunications network, the telecommunications network including a plurality of network elements, the network elements being interconnected to provide a facility for communicating between user terminals connected to the telecommunications network. The present invention also relates to an apparatus for configuring a telecommunications network.

BACKGROUND OF THE INVENTION

Operators of telecommunications systems such as mobile radio networks and wireless access networks deploy the networks in or around places where users are likely to want to use the networks. In this way, the operators can earn income from telecommunications traffic which is communicated via their networks. In order to maximise the amount of income readily generated from a telecommunications network by a network operator it is desirable to deploy the network to provide maximum capacity when there is likely to be most demand from users. Furthermore it is desirable to deploy infrastructure equipment in an optimum way so that the cost of infrastructure can be minimised with respect to the income readily generated from users accessing the telecommunications network.

In order to assist in the planning and deployment of a telecommunications network it is known to use planning tools which provide a simulation or accounting based model of the telecommunications network based on modeling circuit calls and packet sessions generated by users accessing the network. For example, for a mobile radio network it is known to model mobile user equipment generating calls or initiating sessions and to model data communicated via the mobile radio network for each of the sessions or calls. As will be appreciated however, modeling an entire telecommunications network such as a mobile radio network can represent a computationally challenging task for a computer system, particularly, where a mobile radio network is to be modeled from end to end and at multiple layers.

SUMMARY OF INVENTION

According to a first aspect of the present invention, there is provided a method of configuring a telecommunications network, the telecommunications network including a plurality of network elements, the network elements being interconnected to provide a facility for communicating between user terminals connected to the telecommunications network. The method comprises generating a model of each of one or more of the network elements of the telecommunications network, the model including a representation of an amount of network services available to that network element, defining a background node element for generating an effect of a representation of communications traffic according to a traffic profile, the traffic profile representing a number and type of user services which are required to be supported by the telecommunications network, determining an amount of the network services of the model consumed by the traffic profile on a model of a first network element of the telecommunications system, modeling the communication of the traffic profile via the telecommunications network, by propagating the effect of the background node generator to a model of a second network element to which the first network element is connected, to determine an effect of the traffic profile on an amount of the network services consumed, and configuring the telecommunications network in accordance with the evaluated effect on the model.

Embodiments of the present invention utilise a technique which enables a user to apply a background load emulation in a structured manner anywhere in a telecommunications system being modeled and to scale and translate the load produced as necessary to account for frame and protocol overheads as well as an estimate of signaling stream overhead in an automated manner. The load model is controlled and parameterised by a software interface which analyses and emulates a plurality of data communications streams in detail and then replicates the modeled streams into a composite load of many user equipment. According to this technique a traffic profile is defined, which includes a set of communication sessions and the type of communications session, which may include data communications, voice call, text or video communications. Each of the data communications sessions are then combined to form a composite profile to represent a background load generated on a modeled network element. By then propagating the effect of the background load generator from a first modeled network element to a second modeled network element, including evaluating the network services consumed, it is possible to evaluate the effect of the traffic profile on an end-to-end communication. In one example, the effect of the background load generator can be represented by an effective consumption of an available transmission bandwidth as a result of the network services consumed in supporting the traffic profile. The consumption of the transmission bandwidth can be propagated from the first network element to the second network element.

In another example, the loading of network services on an interface between the first and the second modeled network element can be mapped into a loading caused by traffic communicating data between the first and second network elements in the telecommunications network itself. Therefore, by probing this interface in the telecommunications network, the network services and the transmission bandwidth consumed by the traffic profile which has been modeled can be verified by measurements recovered from the real telecommunications network. Furthermore having established and confirmed that the modeled consumption of network services and transmission bandwidth is accurate, the network services and transmission bandwidth consumed at other network elements and interfaces can be determined by scaling the network services consumed by the background load generator in accordance with a change in the modeled load and the type of interface. The scaling provides an advantage because you do not have to probe all interfaces to generate an accurate model of the effect of the traffic profile on a complicated network element.

Having established and verified a background load generator for modeling a traffic loading in the modeled telecommunications network, the method of configuring the telecommunications network may further include identifying a group of logically connected network elements, which form a part of the telecommunications network, emulating the effect of the traffic profile on each network element in the group of network elements by modeling the effect of the communication of the traffic profile for each element in the group, by propagating the background node generator to each of the network elements in the group of elements to determine an effect of the traffic profile on an amount of the network services consumed by the traffic profile in accordance with the type and function of the network element and the traffic profile, and a demanded transmission bandwidth on a connection between the first network element and the second network element, for each interface between the group of network elements and one or more other network elements to which the group of network elements is connected, determining for each of a plurality of values of the parameters of the traffic profile an effect on an amount of network services consumed and a demanded transmission bandwidth available on that interface, and modeling the telecommunications network by representing the group of network elements as a shadow function of network services consumed for a predetermined traffic profile.

Embodiment of the present invention provide a facility for modeling a group of network elements, so that the group can be represented by an effect loading on the interfaces between the group of network elements and neighbouring network elements or groups of elements which interface to that group. Accordingly, the group of network elements can be represented as a shadow characterisation of that group, which can reduce a computationally load to emulate that group of network elements and hence the telecommunications network. In one example the group of network elements is a logical group of network elements within the telecommunications network such as a radio network area.

Various further aspects and features of the present invention are defined in the appended claims.

BRIEF DESCRIPTION OF THE DRAWINGS

Embodiments of the present invention will now be described with reference to the accompanying drawings with like parts being referred to using corresponding numerical designations and in which.

EXAMPLE EMBODIMENTS OF THE INVENTION

Figure 1:
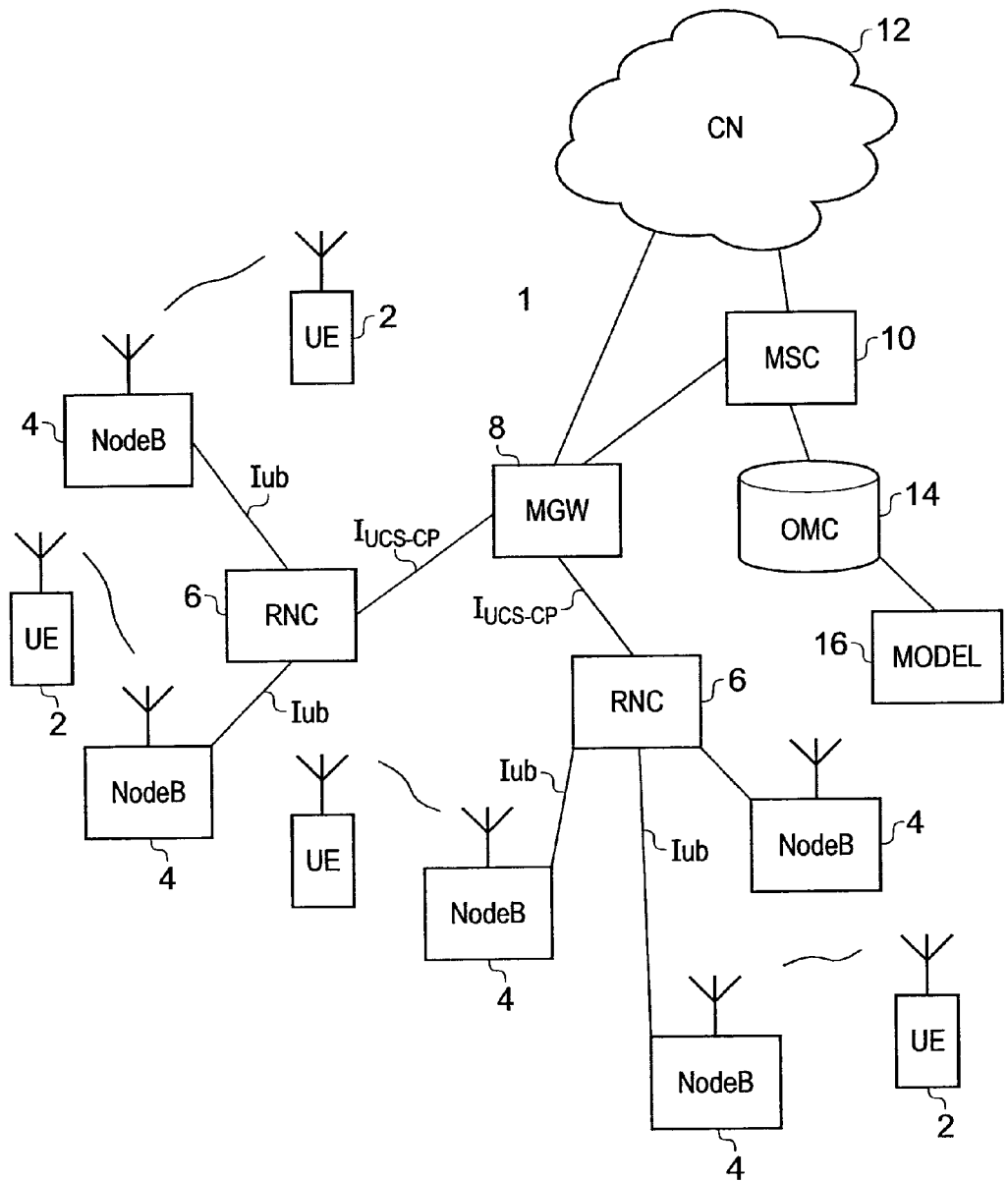
FIG. 1 is a schematic block diagram of an example telecommunications system which includes a mobile radio network.

Examples illustrating the operation of the present technique will now be described with reference to a General Packet Radio System (GPRS) network, an example of which is shown in FIG. 1. As explained above embodiments of the present invention can provide an improvement in the efficiency with which a telecommunications system is modeled and therefore the modeling of the telecommunications system can be made more accurate. As such results produced by the modeling can be used to configure the telecommunications system itself.

In FIG. 1, a conventional UMTS mobile radio network 1 is shown to include a representation of some of its component parts. In FIG. 1 mobile user equipments 2, which are conventionally referred to as mobile user equipment (UEs) are shown to be disposed in relation to node Bs or base stations 4 with which they are communicating data to and from via a wireless access interface. As shown in FIG. 1 the node Bs or base stations 4 are connected to radio network controllers 6 which are then connected to a mobile gateway (MGW) 8. In FIG. 1, the node Bs or base stations 4 and the radio network controllers 6 may be disposed within one geographical region whereas the second group of node Bs 4 and radio network controllers 6 may be disposed in another region. The mobile gateway 8 is then connected to a mobile switching centre (MSC) 10 which is connected to other core network components which form an SS7/Sigtran network 12 for communicating with other fixed and mobile access networks. Also shown in FIG. 1 is an operations and maintenance centre (OMC) 14, which is arranged to configure and control the mobile radio network 1 in accordance with a conventional operation. However, the operations and maintenance centre 14 includes a modeling device 16, which is used to model the mobile radio network. Results of the modeling process can be used to feed back to the operations and maintenance centre to configure the network dynamically as explained in the following paragraphs.

Figure 2:
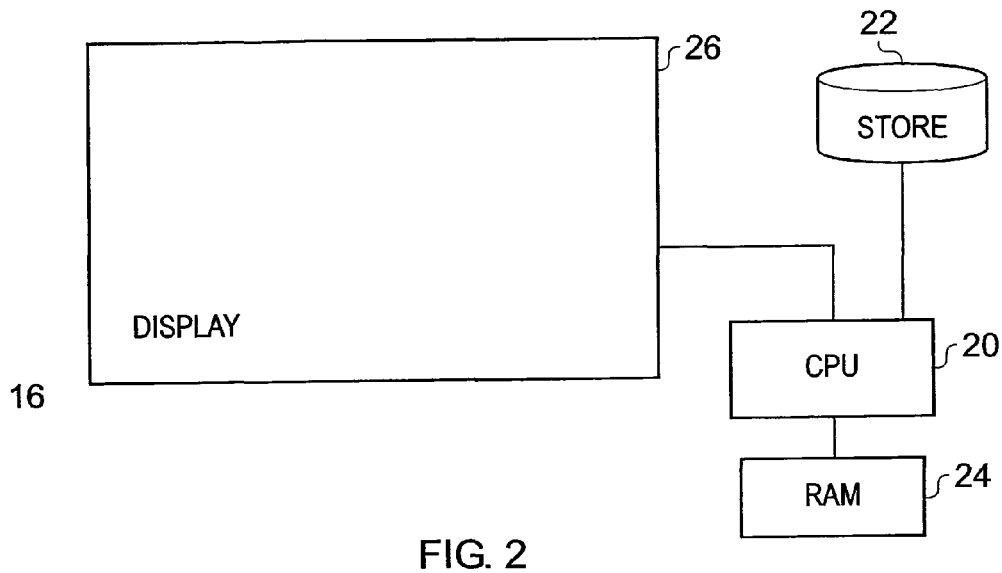
FIG. 2 is a schematic block diagram representing a computer modeling tool for modeling a telecommunications system, which also appears in FIG. 1.

FIG. 2 provides an illustrative representation of a computer system for modeling a telecommunications system in accordance with the present technique. In one example, the computer system forms the modeling device 16 shown in FIG. 1. A CPU 20 is connected to a data store 22 which stores data and processing code for representing a telecommunications system. Also connected to the CPU 20 is a dynamic RAM 24 in which the variables and computer program code for representing a model of the telecommunications system are stored whilst being executed by the CPU 20. The parts of the model are created by selecting preferable representations of the different parts of a telecommunications system and connecting them together as represented on a display screen 26. As represented in FIG. 2, an example of parts of the telecommunications system of FIG. 1 which might be produced and modeled by the computer system are displayed in a more detail on the display screen 26.

Figure 3:
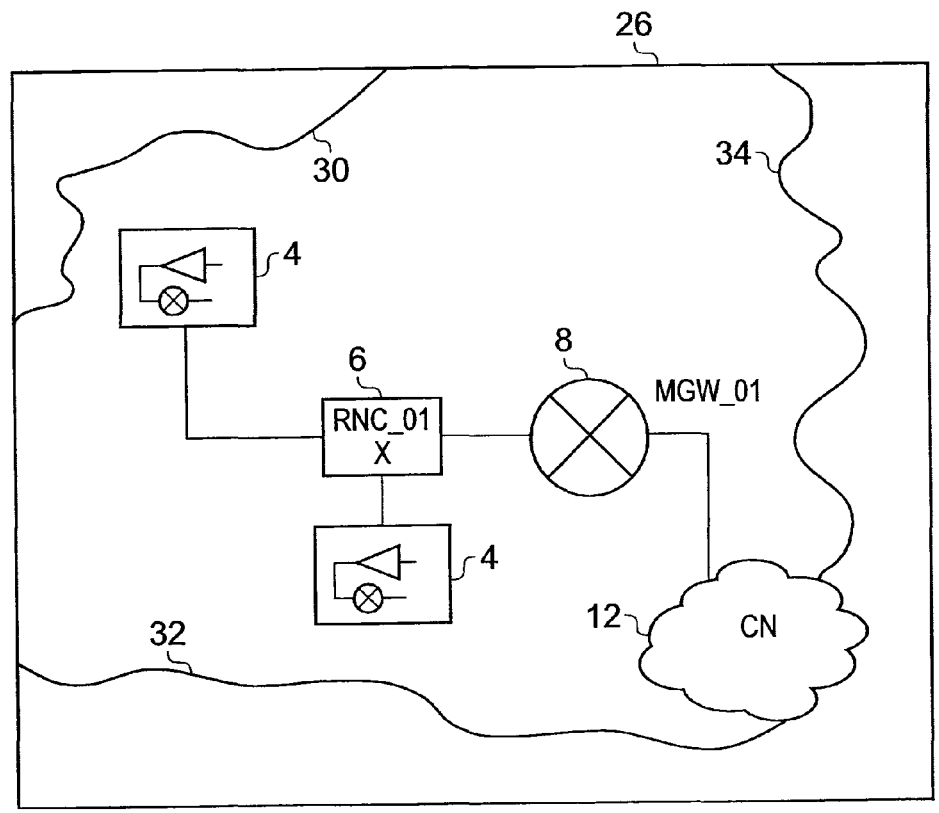
FIG. 3 represents an illustration of a display screen in which parts of the telecommunications system which are being modeled by the computer system shown in FIG. 1 are represented.

As shown in FIG. 2 different component parts of a mobile radio network are connected together within a particular region as represented on the display screen 26. Thus lines 30, 32, 34 represent a boundary of a particular region which is modeled by the computer system. As shown in FIG. 3 node B or base stations 4 are represented by a graphical symbol and disposed within the geographical region which is represented by the lines 30, 32, 34. In addition a graphical representation of a radio network controller 6 is disposed in the group geographical region and connected to the base stations 4. A graphical representation of a mobile gateway 8 is shown connected to the radio network controller 6 and is also again connected to a core network part 12. Thus underlying the graphical representation of each of the components of the mobile radio network shown in FIG. 2 is corresponding computer code which represents the processing of data communications to and from each of those parts in accordance with the operation of those parts in the real world.

Chunking Technique

A large data model of 12 Gbytes can be used in one example by an application running on a system with limited local live storage (e.g. Random Access Memory: RAM) of only 4 Gbytes and addressable and sizable non-live storage (eg: Hard Disk Drive: HDD) of say 100 Gbytes.

In order to render a near real time graphical experience for the user of the network model the use of large amounts of Virtual RAM is not an attractive option.

The system is therefore broken down into groups of logical data entities as Network Elements and Bearer interconnects. However loading thousands of Node Bs or BTS' into the system would use up many Gbytes of memory and leave little room for program tasks thereby constraining the application and the operating system and resulting in a slow experience for the user when using the application.

As explained by the following sections, according to the present technique each BTS and NodeB is instantiated in the model as a chunk with node level information listing: key ports, network element and mobility parenting and load per interface etc, node and connection level Information which adds the details of the entities bearers virtual links etc and Full Build level information which lists all of the entities physical details as well.

The present technique aims to calculate the load impact of a network element or a group of network elements, for example the base stations in a mobility region (LA1) connecting to a radio network controller (RNC) and to calculate a full build of a radio network controller, which is required to support the base stations.

If all of the network model including all of these entities were to be loaded for every such task, task execution would be slow. On the other hand, if only the affected entities are loaded up for this task, but without a representation of the other entities around the ones under consideration then all interactions are not modeled correctly in the application and so errors would frequently be experienced.

Using the proposed method, the task for an envisaged UMTS example is operated as follows:

i) The full model of the RNC under analysis is loaded into RAM memory as: one Chunk, Chunk-Level (All).

ii) Partial models of the NodeBs to be modeled in less detail are loaded in groups or Regions as N×Chunks, M×Regions, Chunk-Level (Node).

iii) The remaining network entities such as mobiles generating load and other core network elements which source and/or sink load are accounted for using background loads.

In this way a good representation of the subject (the RNC), its impacting peers (Node B groups) and its surrounding Regions (core network or other RANs for example) are included/accounted for in the execution task, but a much reduced fraction of the total data model content is required to be loaded into RAM than would normally be required.

This method is envisaged for modeling mobile communications systems where one domain of the model may have a large number of instances and a low level of detail as compared to another domain of the model that has fewer instances but each instance is far more complex to model. Hence, the large difference in scope and resolution detail in modeling both domains in the same end-to-end model can be addressed. In order to achieve a variation of modeling domains, the modeling device 16 utilises techniques which can represent a traffic profile as an effective consumption of network services and transmission bandwidth and furthermore the traffic profile can be propagated to other network elements. Furthermore a group of network elements can be represented as a shadow of itself, which can be used to provide a difference in modeling resolution as explained above. Finally a technique for determining an optimum route via a transmission path between two network elements can be used in assisting a configuration of routing and switching of data at multiple layers.

Load Modeling

In order to achieve the chunking arrangement of the model it is necessary to utilise a technique for representing a group of elements as accurately as possible. In some examples, the modeling system shown in FIGS. 1, 2 and 3 uses a movable background load generator or background node. This technique enables a user to apply a background load emulation in a structured manner anywhere in a telecommunications system being modeled and to scale and translate the load produced as necessary to account for frame and protocol overheads as well as an estimate of signaling stream overhead in an automated manner. The load model is controlled and parameterised by a software interface which analyses and emulates a plurality of simple data communications streams in detail and then replicates these simple models by address to emulate a real composite load of many users. The background load emulation technique is illustrated in FIG. 4.

Figure 4:
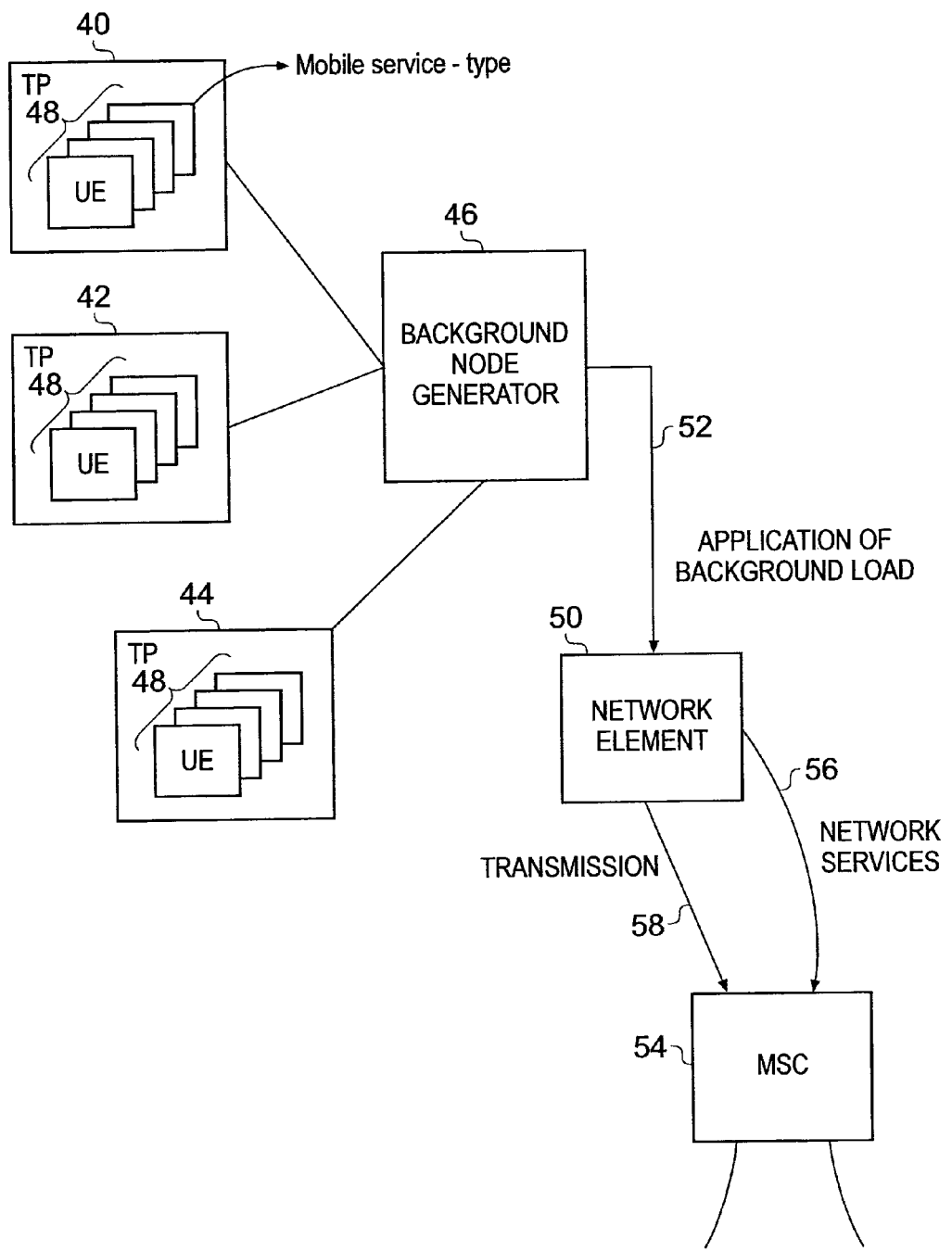
FIG. 4 provides a schematic block diagram illustrating a process of generating and applying a background load model to a network element within the mobile radio network.

FIG. 4 provides an example representation of process steps and calculations used to form a background load generator or "background node". In FIG. 4 three different traffic profiles 40, 42, 44 are specified by a user for forming the background load generator 46. Each of the traffic profiles 40, 42, 44 includes a plurality of mobile services 48 each of which identifies a type of service which will correspond to a mobile communication session. For example, the type of service could be data communications, voice call, text or video communications. Thus within each traffic profile there is specified a plurality of different mobile service types for each of the corresponding mobile communication sessions represented by the traffic profile. Each of the traffic profiles 40, 42, 44 are combined to form a background node generator in which the mobile services are amalgamated. The background node generator is then applied to a network element 50 in an application step 52.

In the application step 52 the mobile services are converted to a representation of consumed network services as the combined traffic profiles are translated into an effective usage of an available amount of network services which can be supported by the element network 50, which is being modeled. The representation of the mobile services and the translation process is illustrated more specifically in FIG. 5.

As the background node is movable its emulation effect is also translatable across a number of network elements in a given system. This technique can be applicable to both the test industry and the vendor equipment industry where self test is an essential function for modern equipment.

Figure 5:
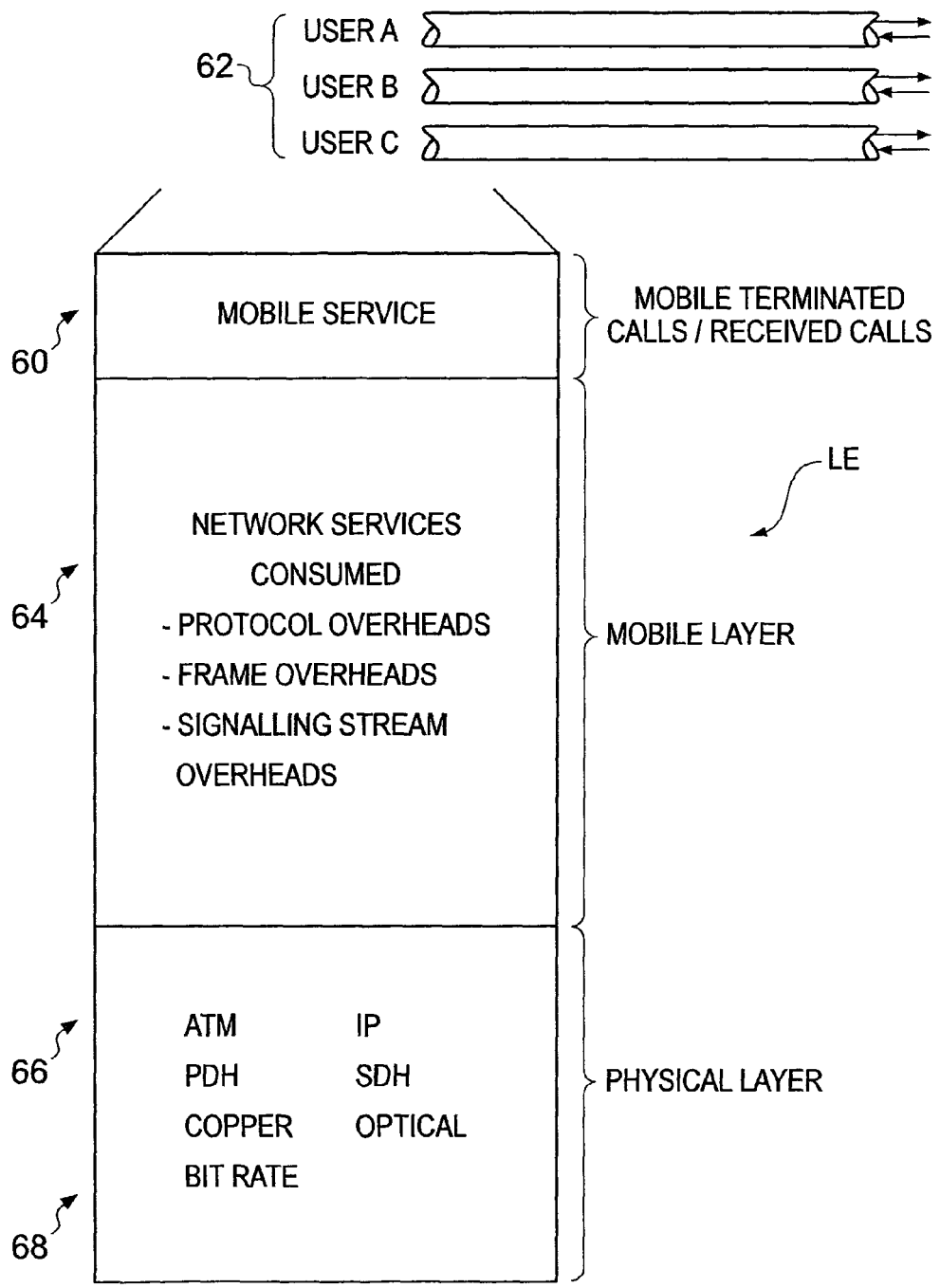
FIG. 5 provides an illustration of a representation of a model of resources provided by a network element.

In FIG. 5 the amalgamated mobile services from the traffic profiles 40, 42, 44 are represented in the mobile service layer 60. Thus the mobile services layer 64 is formed from a combination of the mobile services specified for the traffic profile 62. The effect of the mobile services is then translated into the mobile layer 64 as the network services are consumed. For example the effect of the mobile services would represent an increase of protocol overheads, frame overheads and signal streaming overheads, which are a specified resource of the network element being modeled. Correspondingly, the effect of the network services consumed in the mobile layer 64 can be translated into the use of physical layer resources 66 for each of the physical layer transport types available to the network element such as asynchronous transfer mode (ATM), internet protocol (IP), PDH/SDH, optical, copper etc. Finally at the bottom layer of the physical layer 68 the effect of the consumed network resources converts to a physical bit rate which represents a consumption of an available bit transmission rate on an interface from the network element 46 to a network element to which that network element is connected. Thus in combination, the mobile services, network services and the demand from the physical layer according to a given traffic profile form a combined loading element LE.

The effect of the consumed network resources and transmission bit rate is represented by the connection from the network element 50 to a subsequent network element 54 which for the example shown in FIG. 4 is a mobile switching centre. Thus as represented from the connection between the network element 50 and the mobile switching centre 54 a translation of the background node generator is represented by the network services consumed 56 and the transmission band width consumed 58. Thus according to FIG. 4 the background low generator 46 which represents a collection of traffic profiles can be applied to a network element 50 and the affect of that application represented by both network services consumed 56 and a transmission bit rate consumed 58 when connecting the network element 50 to the mobile switching centre 54. The translation process from the network element 50 to the mobile switching centre 54 can be referred to as propagation of the background node.

Network Shadow Emulation Technique

According to one technique used by the modeling tool 16, which allows for a computationally efficient model to be formed, a movable background load is used in association with an emulation of a number of other network elements in order to emulate the sum of a background load source and sink, combined with the effect of having several other network elements present without having to actually fully model them or represent them with real equipment. As such, for example a whole radio access network may be represented by one model emulation or emulator with the same software to represent many other nodes and to represent real traffic sources and sinks.

A group of equipment forming a region covered in the mobile radio network is emulated by first modeling the network elements and external interfaces polled whilst the network elements are simulated at different load levels. Over several runs of a background node(s), which is used to stimulate the modeled network elements a data-set which represents the effect of load changes at the region's external interfaces according to different stimuli is obtained which can be referred to as "a shadow characterisation" of the region of equipment to be represented. Thereafter the whole area and its composite source/sink background load may be represented by a single entity with the same external ports as the original (model or real equipment), which can be referred to as a shadow emulation version which is a dynamic model. Furthermore, by analysing the shadow characterisation dataset and generating a set of algorithms to represent the load measured during characterisation according to input background load settings, it is possible to generate using extrapolation of these algorithms an emulation outside the bounds of the original characterisation.

This may be applied to a model or a real piece of transmission equipment as a mechanism employed by that transmission equipment as an intelligent routing scheme. An example illustration of the shadow characterisation technique and the shadow emulation of a group of network elements is explained in the following paragraphs.

Figure 6:
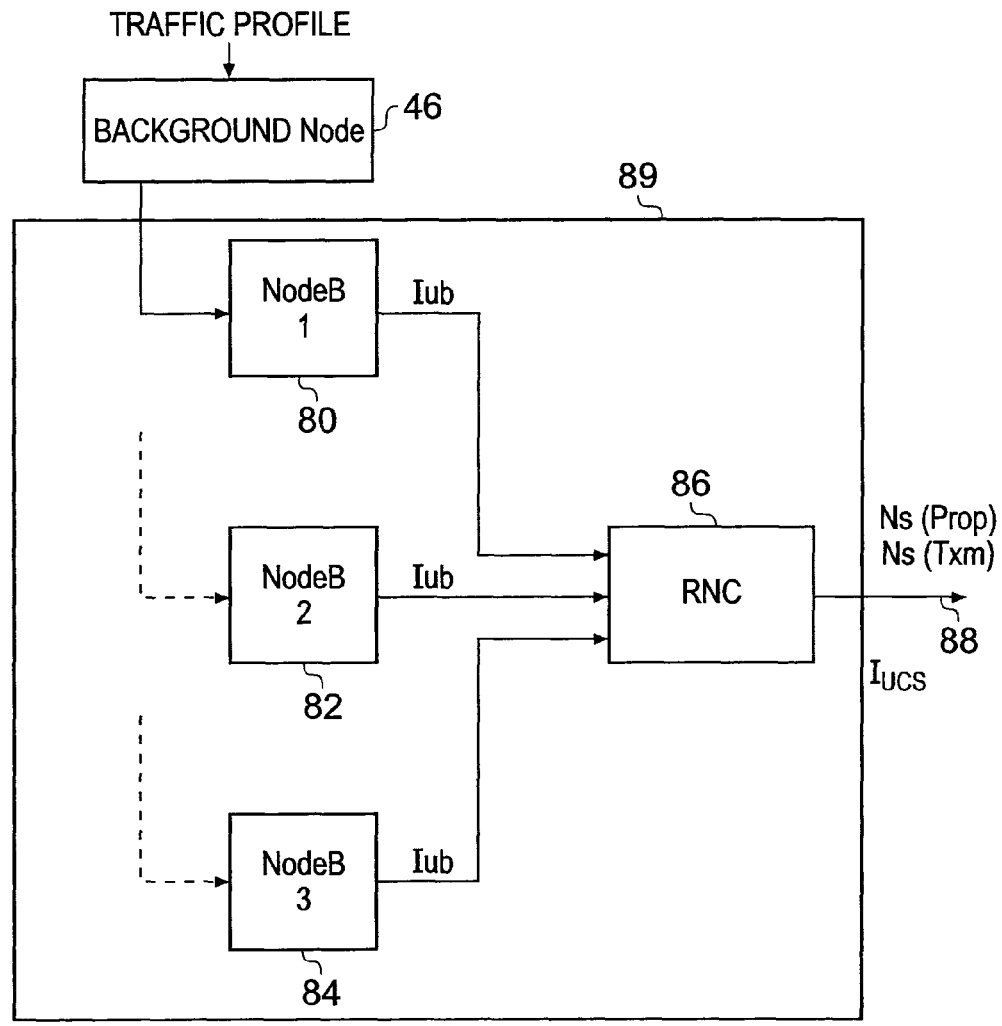
FIG. 6 is a schematic diagram illustrating a radio network area of the mobile radio network shown in FIG. 1, which is being analysed to form a shadow emulation for modeling the mobile radio network.

In FIG. 6 the background node formed in FIGS. 4 and 5 is used to load each of three node B's 80, 82, 84 in accordance with the traffic profile specified for the background node generator 46. Thus applying the background node generator 46 to each of the node B's 80, 82, 84 can represent a loading of that traffic profile on a radio access interface, such as the UTRAN, within a particular geographical area in which the node B's 80, 82, 84 have been deployed. Using the application of the background node 46 to each of the node Bs, an effective consumption of network resources and transmission can be determined for each of the Iub interfaces between the node B's 80, 82, 84 and a radio network controller 86 to which they are connected. Furthermore, in accordance with the present technique the network resource consumed and the transmission bandwidth consumed can be propagated from the radio network controller 86 to the output of the radio network controller on the IuCS interface 88 between the radio network controller 86 and a mobile gateway to which it is connected (not shown). Thus effectively using the background node generator 46, a particular geographical area within a mobile radio network can be modeled by applying the background node generator 46 to each of the node B's. A propagation process is then applied to propagate the network resources and transmission bandwidth used from the node B's to the radio network controller 86 and correspondingly to the output of the radio network controller 86 on the interface IuCS 88, between that radio network controller 86 and a connecting MSC. Thus effectively as shown in FIG. 6 the background node 46 has been used to model a radio network area of the mobile radio network in terms of a loading applied to an MSC. The modeled network area can thereby be represented as a shadow model.

Figure 7:
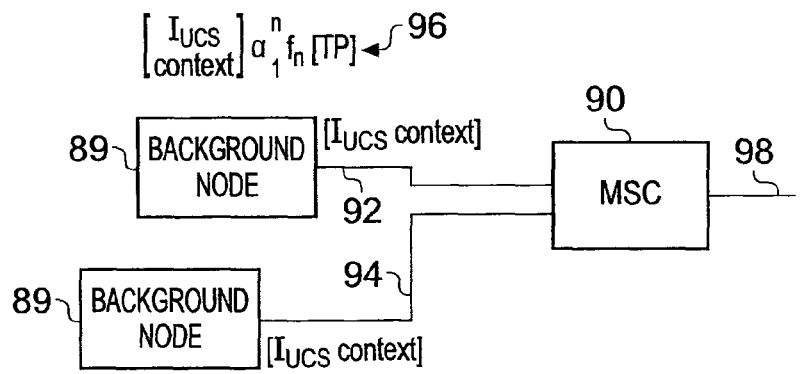
FIG. 7 provides a schematic representation of an application of the model of the radio network area of FIG. 6 when applied to a model of a mobile switching centre.

Correspondingly in FIG. 7 a loading can determined for an MSC 90 by representing the radio network area 89 shown in FIG. 6 and applying that to each of a plurality of connections to the MSC 92, 94 by representing the shadow emulation model formed for the radio access network shown in FIG. 6. Thus effectively the combined loading can be translated in accordance with the formula 96 shown in FIG. 6 to make an effective loading on the MSC 90. Likewise that loading can be modeled at an output of the MSC 98.

Figure 8:
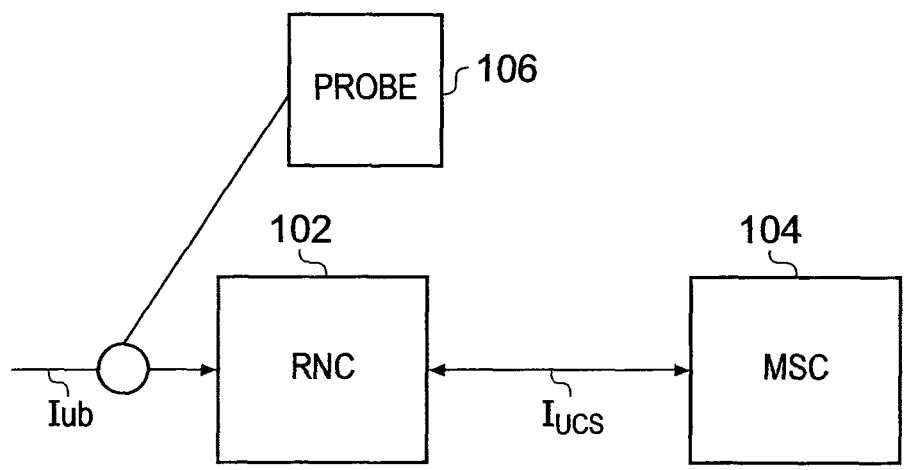
FIG. 8 provides a schematic representation of parts of the mobile radio network shown in FIG. 1, illustrating of process of measuring a loading at an interface between two of network elements in the mobile radio network of FIG. 1.

Results determined from the modeled shadow emulation can be verified, by taking real measurements from the network being modeled. For example, having developed the shadow emulation, a loading on an interface can be determined, for example the Iub interface, between a node B and a radio network controller to provide, a resulting a calculation of network resources and transmission bandwidth consumed. This loading can be confirmed by analysing a real network. As shown in FIG. 8, a radio network controller 102 and an MSC 104 are shown. A probe 106 can be used to measure consumed network resources and consume that transmission bandwidth for a traffic supported by the mobile radio network, which corresponds to a model traffic profile which has been represented in a background node 46. As such measurement can be used to verify a loading on a real network with respect to the modeled network and then an adjustment can be made in terms of the actual resources consumed by that traffic profile.

Figure 9A:
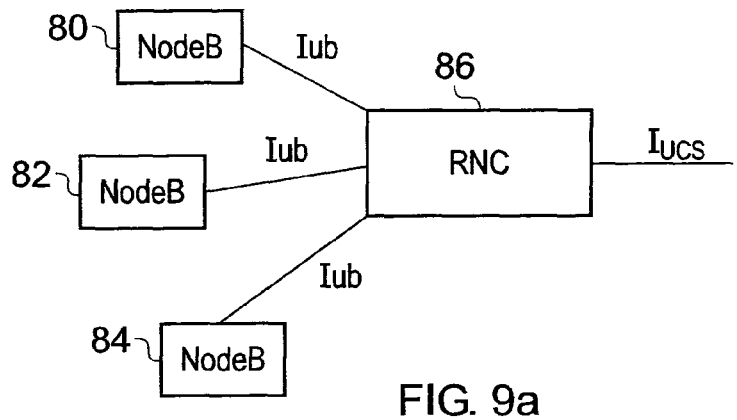
FIG. 9*a* is a schematic block diagram of the network elements of FIG. 6, including a radio network controller.
Figure 9B:
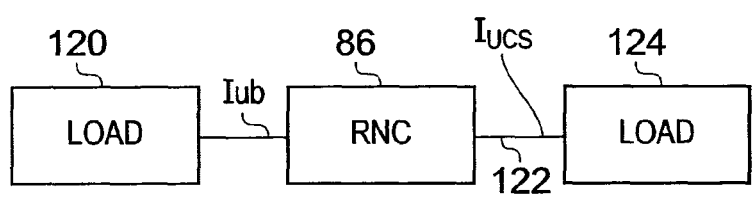
FIG. 9*b* is an illustration of an effective modeling of the radio network controller.
Figure 10:
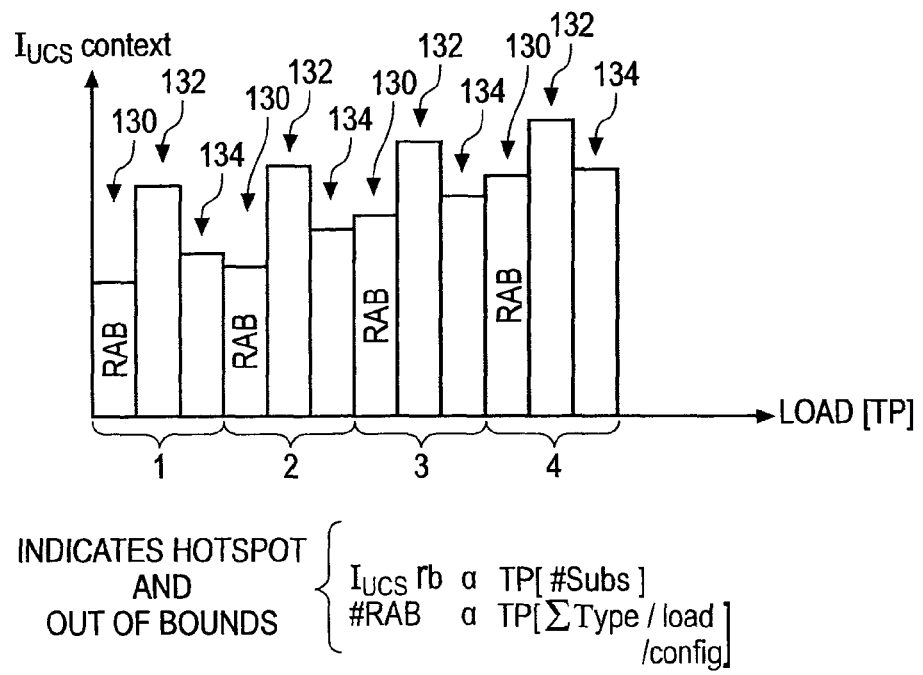
FIG. 10 is a representation of a graph of different parameters of network and bandwidth resources with respect to different levels of loading provided by a background node.

As a consequence of forming a shadow characterisation of a section of a radio access network 89 as shown in FIG. 6, a range of results can be generated off line and stored and used to apply to the model of the entire system on line. Such an arrangement is illustrated in FIGS. 9 and 10. In FIG. 9a the node B's 80, 82, 84 as represented in FIG. 6 are shown connected to the radio network controller 86. As already explained a background node 46 can be applied to each of the node B's to represent a loading in accordance with a predetermined traffic profile. Thus a loading at the input of the radio network controller can be translated into a loading at the output. Thus as shown in FIG. 9b for a given range of traffic profile loading at the input load 120 of the radio network controller 86 on the Iub interface a resulting loading on the IuCS interface 122 upstream of the radio network controller 86 can be represented by a result in upstream load 124. In operation off line results can be generated for a loading on the IuCS interface 122 with respect to an input in accordance with the traffic profile as represented in FIG. 10. A traffic profile for the IuCS example here would include Mobile to Mobile Calls, Mobile to Land Calls, Short Messages and Circuit switched data plus this user planes according Signaling load. In FIG. 10 for each of a plurality of for traffic profile loadings, a result in determination of each of a plurality of parameters are determined, three of which are illustrated in FIG. 10. The parameters may be for example a number of bearers used 130, an amount of protocol overheads 132 and an amount of signaling stream channels occupied 134. Thus the off line results can then be applied elsewhere in the model to represent a range of possible effects on the interface upstream of the radio network controller 122 for different traffic profile loadings.

As will be appreciated, the example provided here is illustrative only, whereas the overall principle of the present technique is applicable to both GSM, GPRS, UMTS, HSDPA, and the EPS and other mobile system evolutions.

Example Loading Emulation: Soft Handover

A topology logical grouping for modeling network elements in accordance with the present technique, can be used to form within a model of a telecommunications network groupings of self-similar nodes such as:

a "ring" of Cross Connects a ring of Optical cross connects a set of STPs operating as an STP SS7 Network a reliable cluster such as a number of MSCs operating with a number of mobile gateways (MGW) that act as a redundant pool.

Here a specific example is provided for soft handover. An emulation of loading on a particular network element can be achieved for mobile nodes conducting a soft handover process between areas, which are covered by a particular RNC. An amount of mobile UE that are engaged in soft hand and roaming from one RNC area to any neighbouring areas is determined in accordance with the following explanation. This represents one example of a load on a network element and as will be appreciated there are other types of loading depending on what is being modeled.

Figure 11:
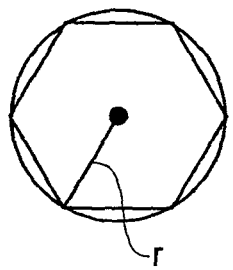
FIG. 11 is an illustrative representation showing a calculation of the area of a modeled cell.

Transform logic can then be used to apply the soft handover loading to other network elements and the effects of source loading, sp as to propagate a load from one network element to another or one side of a network element to another. A soft handover algorithm is illustrated as follows:

FIG. 11 provides an illustration of a cell coverage area. Based on a given radius r, the cell coverage area can be calculated as:

$$\text{Cell coverage area} = \pi r^2$$

Figure 12:
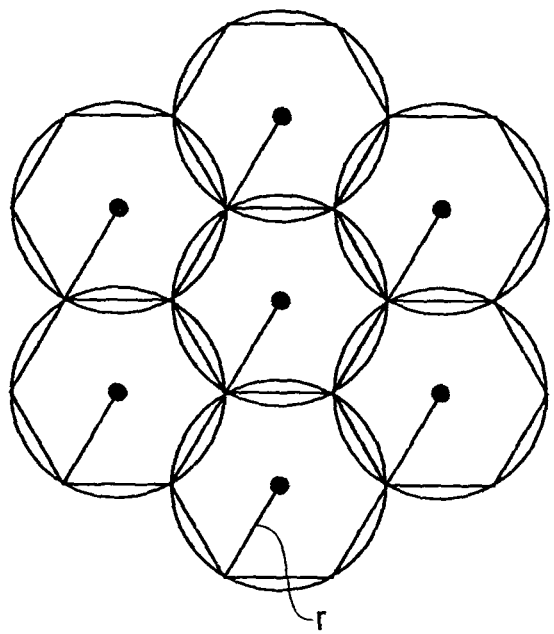
FIG. 12 is an illustrative representation showing a calculation of the area of a Radio network controller (RNC) being modeled which includes seven cells.

FIG. 12 illustrates the calculation of the RNC coverage area which can be determined as:

$$RNC \text{ coverage area} = (\text{Number of cells of the } RNC) \times$$
$$(\text{Cell coverage area})$$
$$= (\text{Number of cells of the } RNC) \times \pi r^2$$

Figure 13:
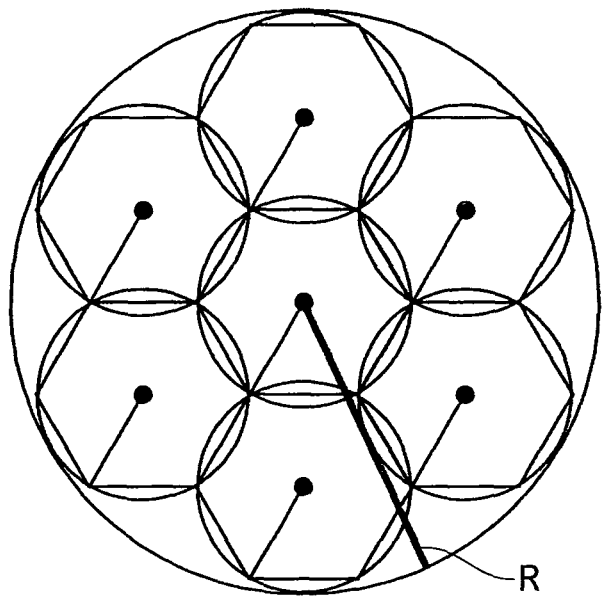
FIG. 13 shows the modeled radio network controller of FIG. 12 with a further calculation for illustrating a process for extrapolating in the modeled network.

The coverage area for the RNC is then determined as shown in FIG. 13, for a radius of the RNC coverage area R as:

$$RNC \text{ coverage area} = \pi R^2 \Rightarrow RNC \text{ radius} = \sqrt{((RNC \text{ coverage area})/\pi)}$$

Figure 14:
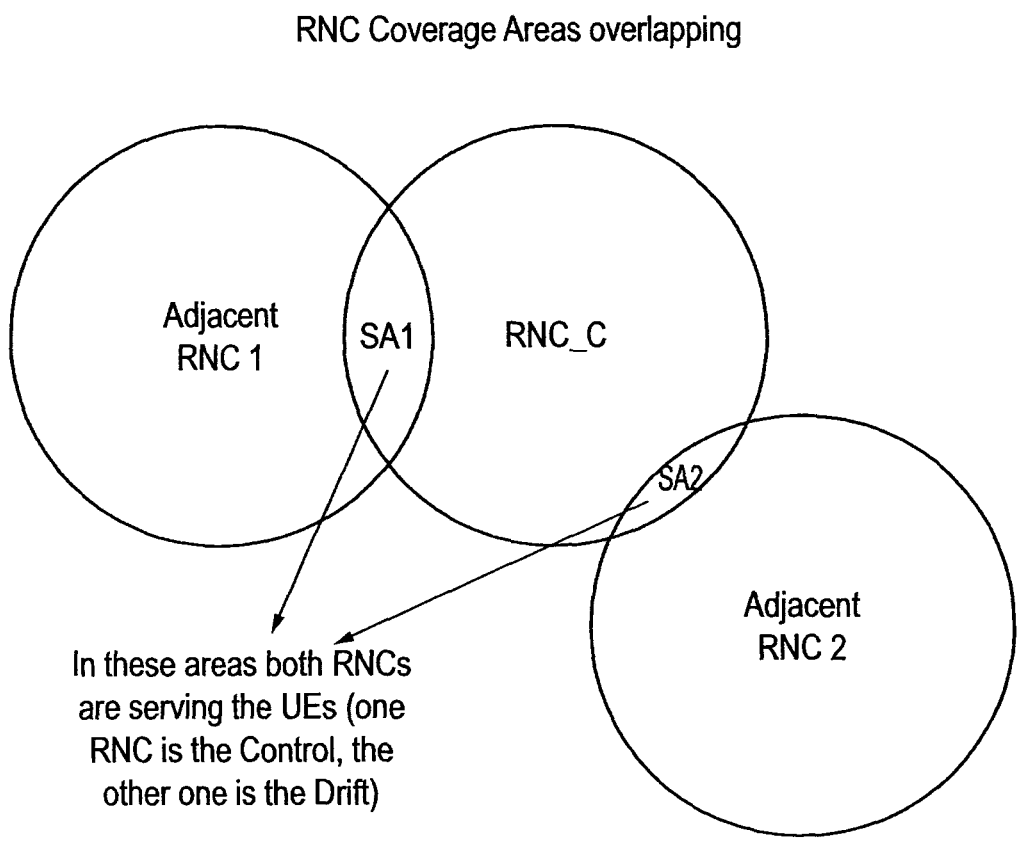
FIG. 14 is an illustrative representation of three modeled areas which are controlled by three radio network controllers for providing an illustration of an emulation of loading on one of the radio network controllers due to soft handover.
Figure 15:
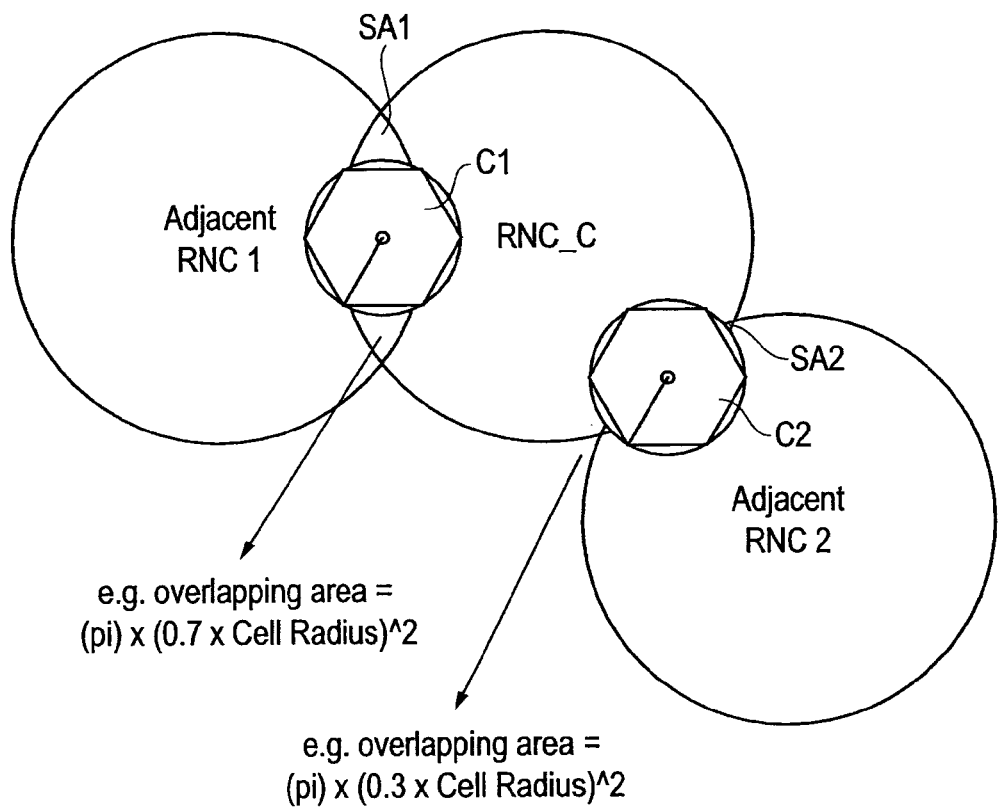
FIG. 15 is an illustration of the modeled areas served by the radio network controllers of FIG. 14 showing a further step in an algorithm for emulating the loading on the radio network controller.

Soft handover is a technique in which the mobile UEs are communicating with two cells contemporaneously as the mobile moves from one cell coverage area to another. For the present example we consider the case where a loading is caused by mobile UEs moving from one RNC area to another. An RNC which covers a network area to which the mobile UEs are roaming to is referred to as a control RNC and the RNC from which the mobile UE's are roaming is referred to as a drift RNC. Mobile UEs which are disposed between two RNC areas are those which are engaged in a soft hand-over process. These areas are shown in FIG. 14 as SA1 and SA2 for a control RNC RNC_c and first and second adjacent RNCs RNC1, RNC2. FIG. 15 illustrates an example of a relative distribution of overlapping coverage areas SA1, SA2 are assumed to be served by a fraction of the cell area of two serving cells C1, C2. The overlapping area served by the first cell c1 is assumed to be 70% of the cell radius, so that:

Overlapping area $SA1=\pi 0.3r^2$

Figure 16:
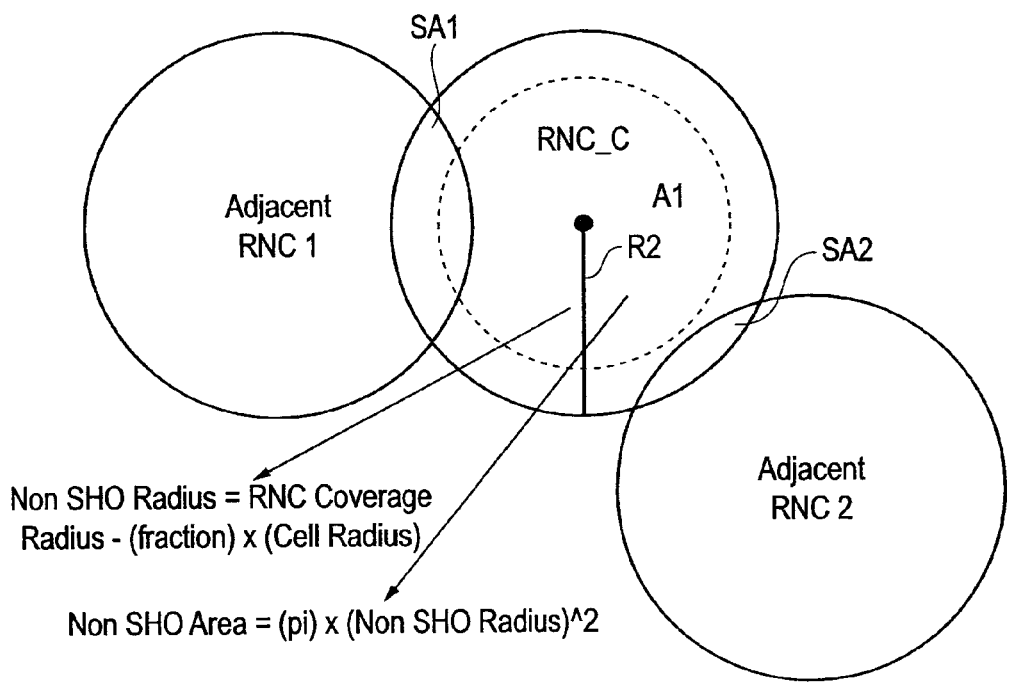
FIG. 16 is an illustration of the modeled areas served by the radio network controllers of FIG. 14 showing a further step in an algorithm for emulating the loading on the radio network controller.

Whereas for the second cell c2, the overlapping area is assumed to be 30% of the cell area, so that Overlapping area $SA2=\pi 0.7r^2$ In order to estimate the loading which is caused by soft handover from the adjacent cells on the target control RNC_c it is necessary to determine first the loading caused by mobile UEs that only this RNC RNC_c is serving. An area A1 shown in FIG. 16 is considered to represent a region within which mobile UEs are only served by the control RNC RNC_c and are therefore not involved in the soft handover process. The area within which mobile UEs are not involved in a soft handover from adjacent cells is therefore determined with respect of a radius R2, which is a fraction of the total RNC coverage area radius R. Thus for the target RNC, RNC_c, the radius R2=R×fraction, so that the area which includes mobile UEs which are not taking part in soft handover becomes:

Non soft handover area=$\pi R2^2$

From this calculation it is possible to determine as a fraction the coverage area for which loading is being induced as a result of mobile UEs engaging in soft handover, namely soft handover area fraction=(RNC coverage area−non soft handover area)/(RNC coverage area)

Figure 17:
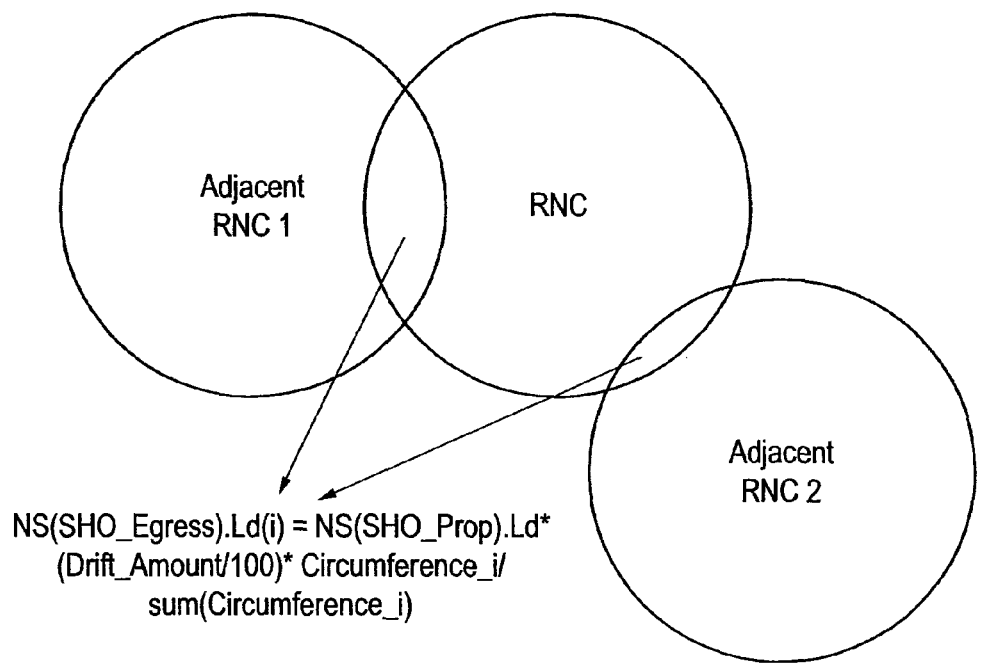
FIG. 17 is an illustration of the modeled areas served by the radio network controllers of FIG. 14 showing a further step in an algorithm for emulating the loading on the radio network controller.

FIG. 17 then shows the soft handover traffic from the control RNC RNC_c to the adjacent RNC, RNC1, RNC2, which can then be determined as:

NS(SHO_Egress)·$Ld(i)$=NS(SHO_Prop)·$Ld$*
(Drift_Amount/100)*Circumference_$i$/sum(Circumference_$i$).

In this expression, "Drift Amount" represents a proportion of the traffic generated by the mobile UEs for the particular RNC for which the Egress or out board traffic is being modeled. The Drift Amount will be different depending on the location of the RNC and is set empirically from experience and observing real world conditions. For example if the RNC is at a board of a country then the drift amount will approximately 10%, but if the RNC is within a country at a remote location then the drift amount will be 2-3%.

The NS(SHO_Egress) is the loading on the network services as a result of the egress of traffic from the target RNC. This is a function of the network services which are propagated to the RNC which is based on the soft handover area fraction, which is worked out for the fraction of mobile UE traffic which is considered to be engaged in soft handover as established above. Thus the network services which are represented by this traffic as the soft handover area fraction is determined and applied to this part of the equation.

The fraction of Circumference_$i$/sum(Circumference_$i$) provides an empirical determination balancing the amount of the mobile traffic which is egressing from the RNC being modeled with respect to all of the RNCs that are surrounding that target RNC. Accordingly a fraction of the egress traffic is determined with respect to the ingress traffic from the surrounding RNCs. This calculation has been determined from an observation of real world results with respect to results modeled using this expression.

According to this expression, the network services NS can be determined as a function of a loading for a given soft handover egress loading, a drift amount and the circumference of the RNC area. Using this expression each background load may be loaded onto multiple network element services (NES) at multiple networks. Furthermore, each traffic model may be loaded with a weighting of 0-100% such that the N×Traffic models all add up to a 100% loading, but the service loading within each traffic model is able to be set independently.

For this example "algorithm" for soft handover a trial with specific input loads can be used to determine the load on the network element and the output interface which can then be extrapolated. The following section explains the termination of network services NS and the propagation of the network services to other network elements based on a function of the network element being modeled.

Example of Transform Logic

Figure 18:
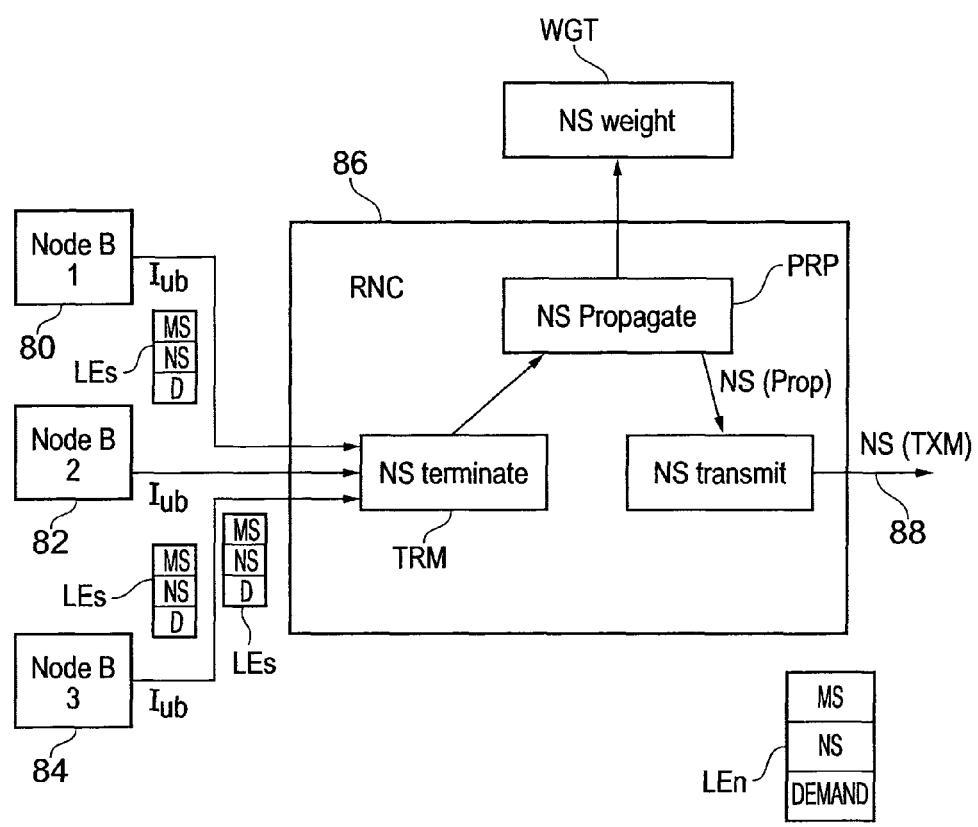
FIG. 18 is a schematic block diagram illustrating elements within a modeled network element which are used to emulate a loading on that element and a propagation of loading from a south side of the network element to the north side.

FIG. 18 provides an example illustration of how transform logic is used to convert loading of resources from one side of a network element NE, which is referred to as a south side to another side of the network element NE referred to as a north side. In accordance with the function of the network element NE, the south and north sides may include both input and output interfaces.

As an example, we consider the RNC 89. As shown in FIG. 6, at the south side of the network element NE a loading elements LEs are provided, on from each of the Node b's 80, 82, 84, which are terminated within the RNC 89 at a termination block TRM. The termination block TRM is arranged to translate the received loading from the south side Les, which are corralled from the Node B's 80, 82, 84. Only the network services NS are corralled because the other loading elements of the mobile services MS and the physical layer demand D, can be determined from the network services alone. The network services NS are combined by the NS terminate block TRM and then passed to a propagation block PRP for translating into the north side loading element LEn and the weighting on the RNC 89 itself, which is represented by a NS weight block WGT.

The network services propagate block PRP is arranged to apply transform logic on the received combined network service loading from the NS Terminate block TRM to propagate the network services loading NS(prop). This will include determining a loading on protocol stacks and resources consumed by the network element being modeled and also the extent to which the modeled network will load the network services at the output of the network element. For the example of the RNC 89, the network services consumed as a result of the propagation to the north side will depend on and will be a function of the Ius interface. The process of propagation will also determine a weighting on the network element itself, which represented by the NS weight WGT.

A network services transmit block TRT translates the output of the propagation block PRP into the loading element on the north side LEn, which can be represented by the transmitted network services NS(TXM) and mapped into the equivalent mobile services MS and the physical layer resources D.

Figure 19:
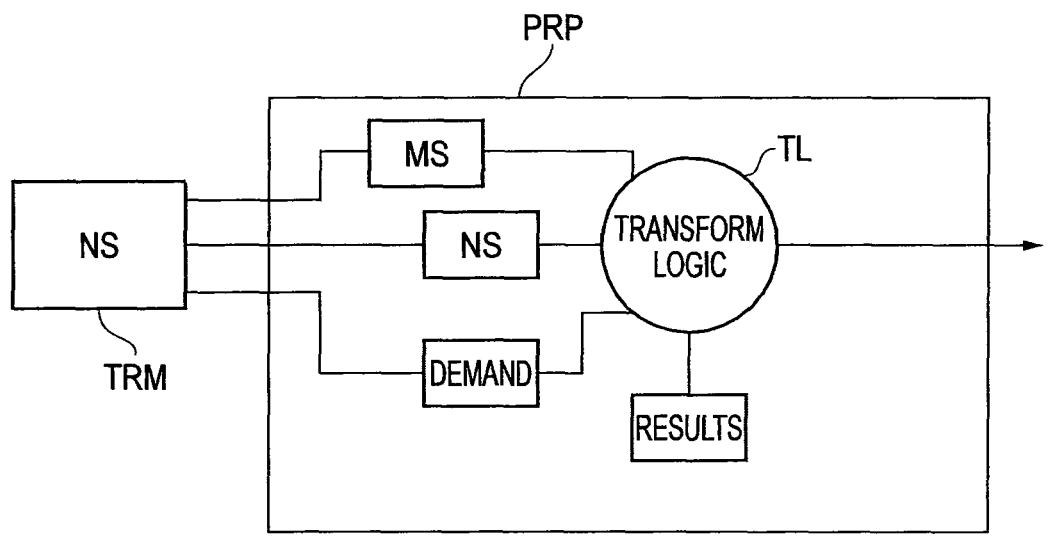
FIG. 19 is a schematic block diagram of a propagation block which appears in FIG. 18 for propagating loading from a south side of the network element to the north side.

An example of the transform logic, which is used to propagate loading elements from the south side to the north side, is shown in FIG. 19. As shown in FIG. 19, the south side loading element LEs components, mobile services MS, network services NS, and physical layer resources Demand, are fed from the termination block TRM to the transform logic TL, which adapts the loading caused by the loading element LEs on the network element itself and the loading on the north side loading element LEn in accordance with the function and operation of the network element as explained above. The transform logic may work on the network services only, but may take into considerations in some functions the other loading elements MS and D.

As illustrated by the example for soft handover egress for an RNC, a combination of empirical functions and analytical techniques can be used to generate the transform logic which converts an input load on network services to a load on the network element concerned and the load on the output interface of the network element.

Chunking Examples

Figure 20:
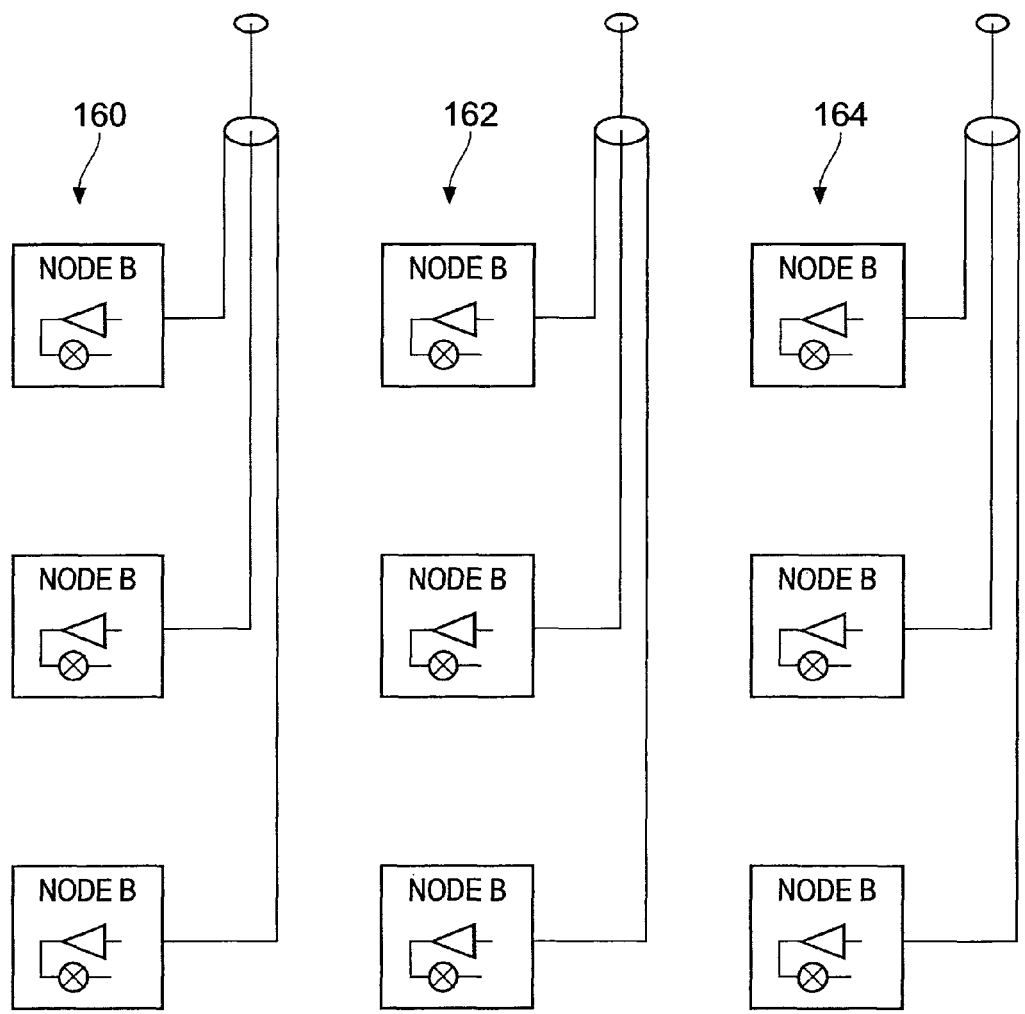
FIG. 20 is a schematic block diagram illustrating a grouping of node B's or base stations into groups or regions.
Figure 21:
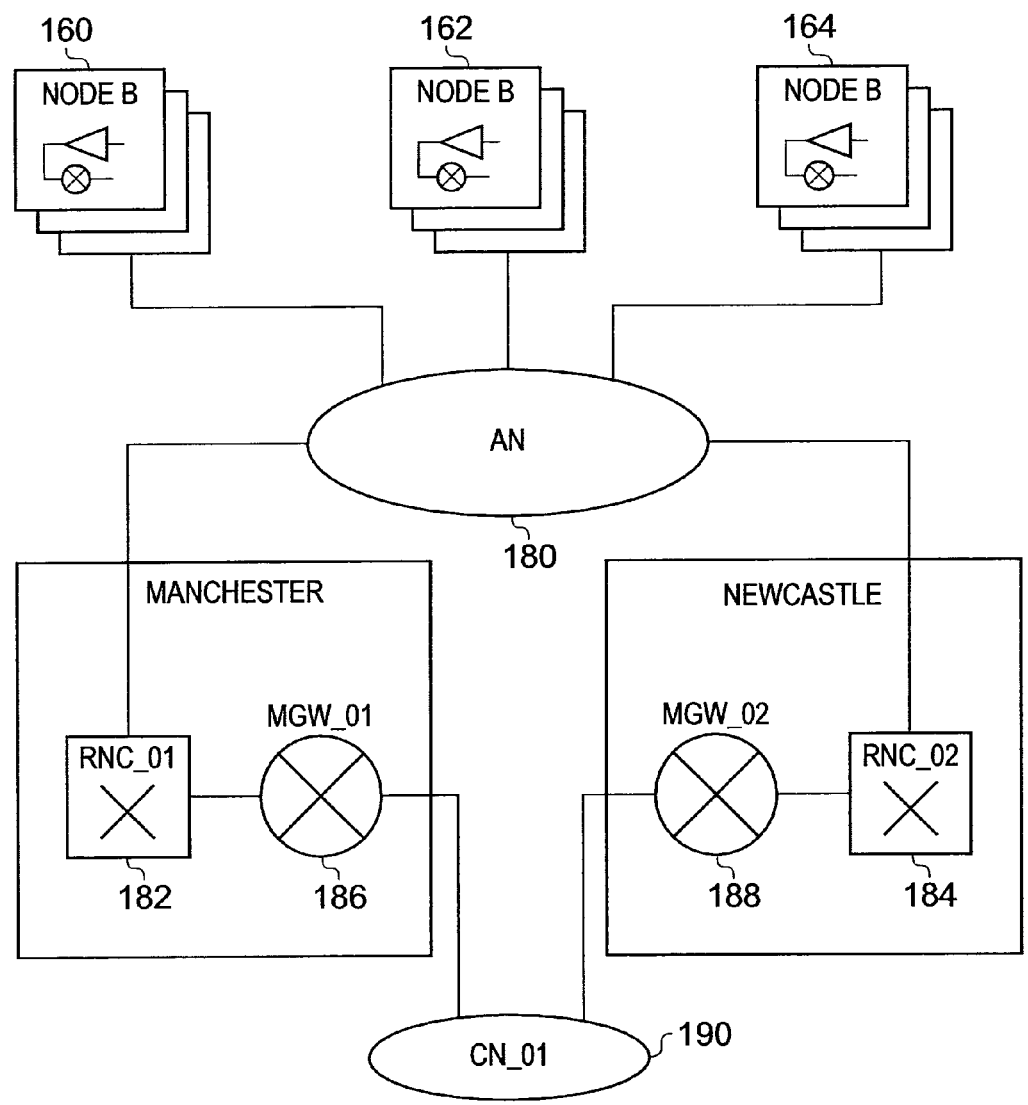
FIG. 21 is an example of the connection of the groups or regions shown in FIG. 20 in which one of the groups or regions is being processed to model the effect of that region but the remaining groups are modeled as background representations only.

As explained above, the present technique provides a way of modeling the mobile radio network shown in FIG. 1 in a way which improves the scope and resolution requirement of each of the components of the network whilst reducing the amount of processing power required to compute the model and also an amount of memory occupied by the model at any one time. To this end, for example each of the base stations or node Bs shown in FIG. 1 may be divided into different groups. In one example some of the different groups represent different regions. FIG. 20 provides an example illustration of a grouping of base stations or node Bs into five groups 160, 162, 164 which are connected correspondingly to an access network and then to a corresponding radio network controller. Each of the node Bs is located at an individual site which is represented by a corresponding population of users and therefore a relative loading or amount of traffic generated from those users can be represented from that site. As shown in FIG. 21 the node Bs which are grouped into the three regions are processed by the model representing each of the node Bs and each of the groups to represent the total amount of traffic and loading caused by the node Bs on corresponding communications channels 170, 172, 174 which connect the groups of node Bs to an access network 180 and radio network controllers 182, 184 and correspondingly mobile gateways 186, 188 which are then connected to a core network 190. The radio network controller 182 and mobile gateway 186 may serve a first region for example "Manchester" and second radio network controller 184 and the second mobile gateway 188 may serve a second region for example "Newcastle". Therefore other parts of the telecommunications system served by other regions for example "Bristol" and "London" 92, 94 maybe correspondingly represented by the model.

According to the present technique as illustrated in FIG. 21 the Node Bs illustrated in FIG. 20 are grouped into regions. Accordingly, each region is modeled for a first time period within which a relative loading which each of those regions causes on the traffic communicating within that region with the corresponding access network and radio network controllers 82, 84 is determined. Therefore for a next time period the loading which that network produces on the connecting channel is modeled without processing a model of each of those node Bs and the traffic produced by the corresponding mobile user equipments which are communicating with the node Bs. Thus as illustrated in FIG. 21 only the region for Manchester 60 is currently being modeled in detail where as the remaining regions 162, 164, are modeled in background that is to say modeled as a shadow emulation using the technique described above to represent the loading produced within a previous time interval during which those regions were modeled in detail. Thus according to the present technique the computer system is arranged to load the models for the node Bs into memory to be processed by the CPU for a time period only for the node Bs associated with region 60 whilst the remaining regions are represented as an extrapolation or an interpolation of the loading produced when those regions were previously modeled. Thus each of the regions is cycled through in turn for respective time intervals by loading the regional model into RAM 4 and processing the model using the CPU 1 and representing each of the remaining groups or regions as a loading based on the loading produced previously when that region was loaded into RAM 4 and processed by the CPU during a previous time period.

Multi-Layer Modeling Technique for Optimised Routing using Linked Layer-Reachability Tables The modeling system 16 may also include a technique which can be used to identify an optimum transmission path between two or more network elements of a telecommunications network. For most router or switch cases, these elements route or switch according to a simple set of parameters. These parameters can be a limited subset of a set of parameters which characterise only the layer at which the transmission function (route/switch) is being applied. As a result, although the transmission function is very fast, the transmission of data in terms of costs and resources may not be cost effective. Furthermore, if a transmission scheme were overly complex requiring too many parameters to be processed per transmission function, then the transmission function may be cumbersome and slow despite potentially being very well bound to the transmission action being performed.

Often oversimplification of routing solves a problem well on one layer but is less efficient as an N-Layer transmission solution.

What is needed is a reliable and fast set of transmission algorithms which consider N-Layers of a telecommunications model, which can be built up over time as a set of transmission routing tables and bindings. According to the present technique, a transmission function on one layer can be executed whilst applying a selection of nominated applicable constraints from nominated other layers in one step as a matrix of parameters per routing algorithm execution. The technique includes the following steps:

Step-1: Initially route at only layer where information is available (as before)

Step-2: As more information about the network is generated at each network element, then a Reachability Matrix per modeled layer and each rank per route is stored and indexed.

Step-3 Future transmission function executions cross check the layers available in the given time allocated for routing within the end to end (ETE) delay constraints for this transmission network element.

Furthermore, by applying these complex routing schemes at a transmission routing network element in a software model and storing the resulting tables generated, then the same tables may be applied back to the real network elements with the same complex transmission function scheme. As a result, a multi-layer set of reachability map will be produced within the telecommunications network, without the network elements having to live route to determine an optimum transmission path and map of transmissions options. Thus a telecommunications system can be deployed already optimised by using this multi-layer routing plan and port algorithms. This is in contrast to planning a network with transmission and routing of communications between network elements without the pre-planned multi-layer routing and then determining whether the deployed system is efficient and optimising the deployed system by trial and error. Furthermore, a multi-layer table driven system is much faster than a purely mathematical algorithm.

The technique can also be deployed to avoid shared fate issues of planning multiple routes for reliability at layer N but then mapping them unaware to the same bearer at layer N−1.

The technique is applicable to modeling tools, test equipment and vendor transmission equipment and by applying the same multi-layer reachability table driven approach to routing across all of these entity types then a Policy Control Entity (PCE) system may be employed either operating by centrally check-pointing all transmission nodes to a central table repository system or by a future system of inter-transmission routing query messages from to a router.

A term that is emerging for network elements that can operate at multiple layers is a Multi-Service Platform or (MSP).

Figure 22:
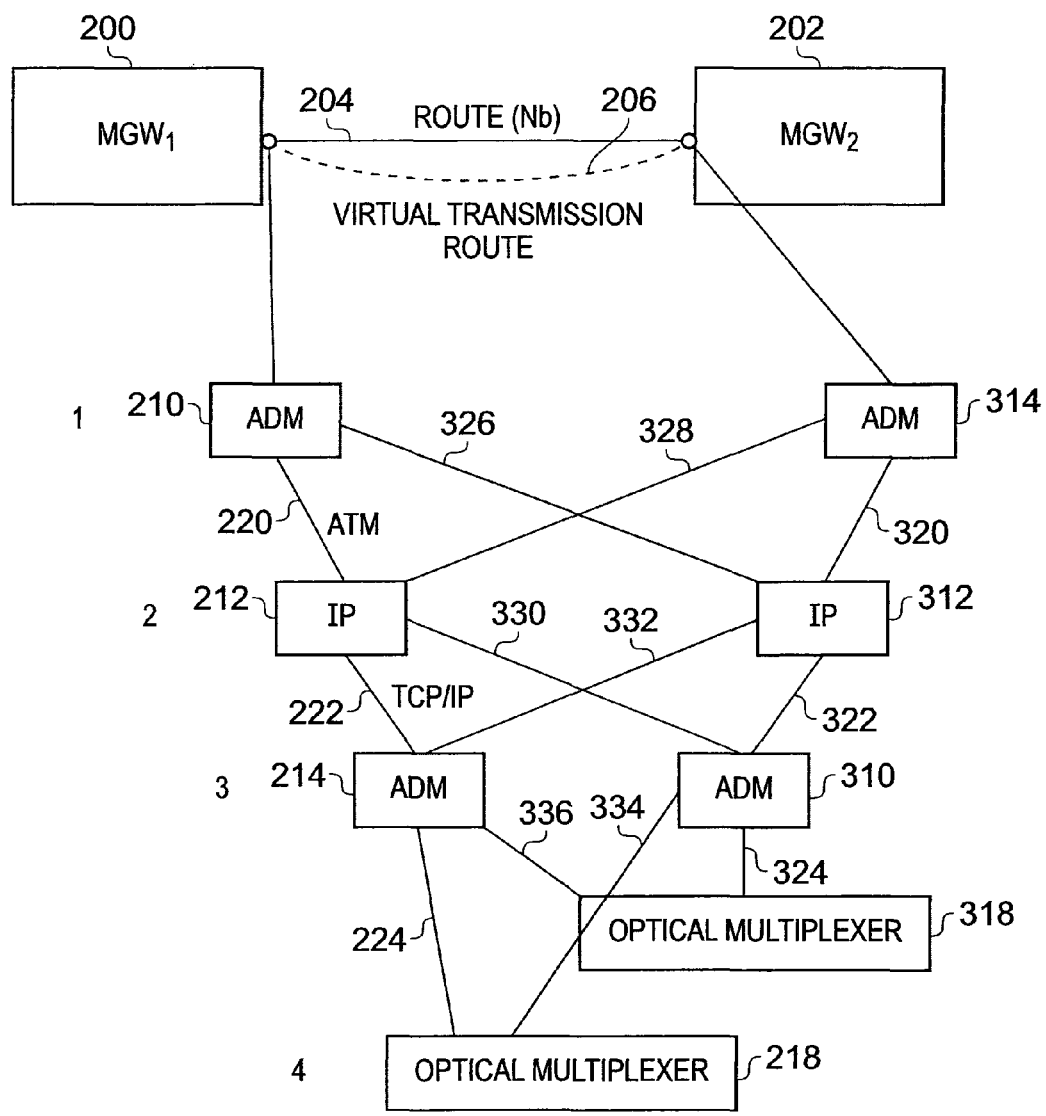
FIG. 22 is a schematic block diagram illustrating connections between two mobile gateway elements via a plurality of layers of transmission layers.

FIG. 22 provides an illustrative representation of two elements in a mobile radio network which may be modeled by the modeling tool 16 shown in FIG. 1. According to the present technique the modeling system 16 is arranged to perform the multi-layer route planning for communicating between two network elements. As shown in FIG. 22 a first mobile gateway 200 may be connected to a second mobile gateway 202 via a connecting interface 204. However a virtual transmission route may represent the communication of signaling and data between the mobile gateway 200 and the mobile gateway 202 which effectively forms an interface for transmission of the signaling and data between the two mobile gateways 200, 202. The virtual transmission path may be comprised of a plurality of elements which are connected at each of a number of different layers. For the example shown in FIG. 22 there are four such layers, which may correspond to a layered telecommunications model. A first layer includes an add drop multiplexer (ADX) 210 as second layer in an intellect protocol (IP) connection 212 a third layer is another add drop multiplexer (ADX) 214 and finally a fourth layer uses an optical multiplexer which performs a transmission function 218 for data at the physical layer. A connection between the add drop multiplexer (ADX) 210 and the internet protocol (IP) layer 212 may be via ATM 220 whereas a connection between the internet protocol layer 212 and the add drop multiplexer 214 may be via TCP/IP 232. Finally, again the connection between the second add drop multiplexer 214 and the optical multiplexer 218 may be via ATM 224.

Correspondingly, a second group of transmission elements may be provided at a plurality of different layers for the second mobile gateway 202 in order to complete the transmission path between the two mobile gateways 200, 202. For this example, there are correspondingly four layers, which provide an add drop multiplexer 310, an internet protocol (IP) layer 312 and an add drop multiplexer 314. A further optical multiplexer 318 is provided at the physical later and is connected to both the add drop multiplexers 214, 310. Furthermore, each of the network elements are linked by transmission channels in correspondence with the first group of elements. Thus the layer three add drop multiplexer 310, the layer two internet protocol router 312 and the add drop multiplexer 314 are link by transmission links 320, 322, 324. In addition, it is also possible for the transmission elements from the first group 210, 212, 214 to be linked by transmission channels 326, 328, 330, 332, 334, 336 from the second group 310, 312, 314, because transmission of data from one layer may be made to transmission elements at another layer via more than one route to more than one network element. Thus in effect the communication of data between the two mobile gateway network elements can be via several different paths between the transmission elements in the four example layers illustrated in FIG. 22.

Figure 23:
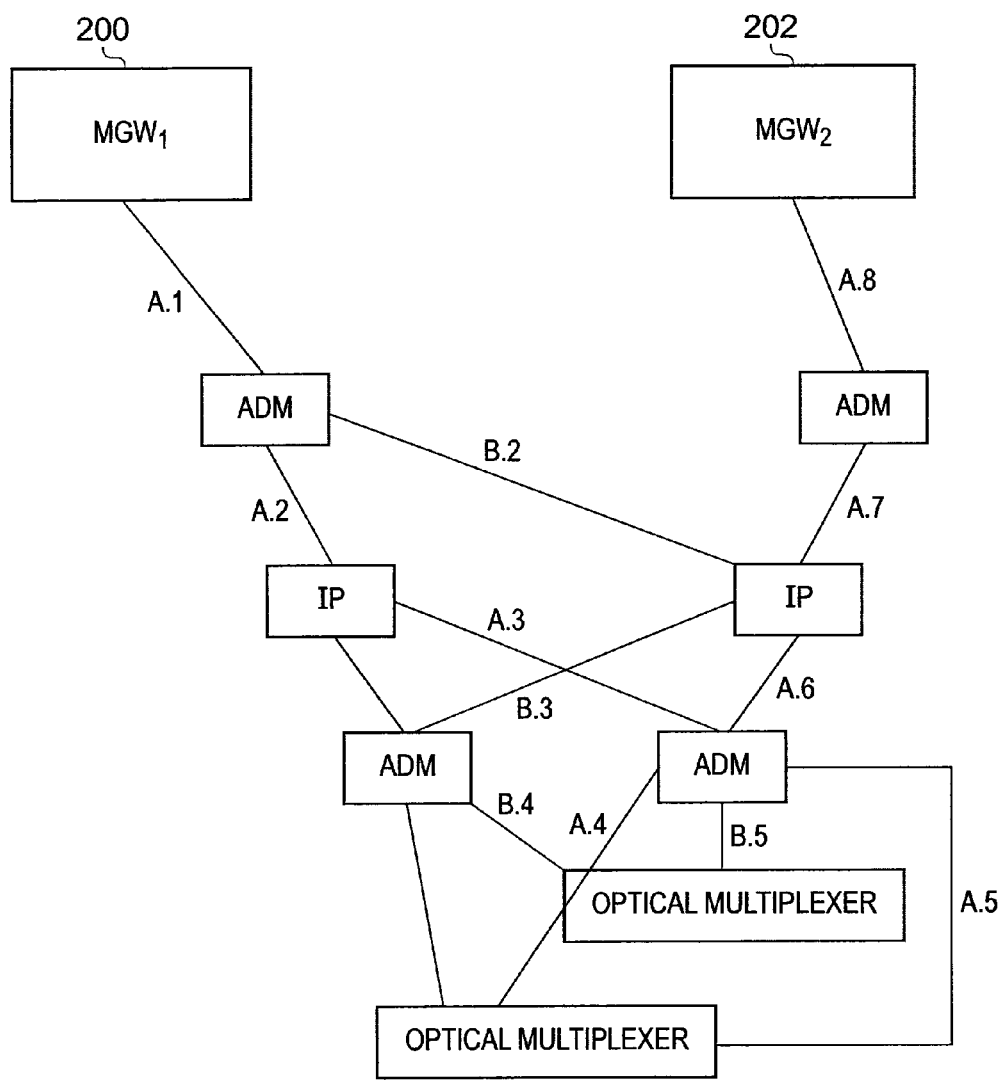
FIG. 23 is a schematic block diagram providing a simplified representation of the layers of transmission elements of FIG. 22.

FIG. 23 provides a simplified representation of the transmission elements shown in FIG. 22, which are arranged to communicate data between the two mobile gateway transmission elements. In FIG. 23, two example paths are shown between the two mobile gateways 200, 202. The first path includes transmission channel links A.1, A.2, A.3, A.4, A.5, A.6, A.7, A.8. The second path includes the transmission channel links A.1, B.2, B.3, B.4, B.5, A.6, A.7, A.8. Each of the communications links can be labelled in this way to assist on determining an optimum path for data transmission between the two mobile gateway nodes 200, 202.

For each of the paths, weightings are determined in accordance with one or more optimisation functions. Typically, three or four optimisation functions are optimised at a time. The Optimisation functions are a set of generic optimisation algorithms of which there are many, but the inputs to these algorithms are derived from the model constructs such as connectivity, cost of physical objects supporting paths (connectors, bearers maintenance of objects such as transmission equipment, etc) and all of which are used by communicating using that connection.

The present technique provides an arrangement for optimising a transmission path between the two mobile gateway elements 200, 202 where a plurality of different layers in which different components may be available for communicating. Thus, there may be more than one path through a layer of network elements which may or may not be more efficient. The optimisation is determined in accordance with the following steps:

The reachability matrix is determined for each element at each layer which identifies the other elements on the layer which can be reached.

Each path to each layer on the reachability matrix for each connection from a component is then weighted in accordance with a pre-defined metric. The metric may represent a cost in terms of network resources or transmission band width required to connect one network layer with another.

For each of all possible paths for communicating between two network elements a combined weighted sum is formed for that transmission path.

Finally an optimum path between two network elements is determined from the weighted sum.

Typical Optimisation Function Examples are:
i) Cost of Reachability from this node to Reachable node in terms of equipment and maintenance of equipment to support
ii) Delay incurred by services along each path
iii) Number of nodes traversed
iv) Number of layers of transmission technology traversed (usually there is more processing involved and hence more cost the more layers are traversed on the path)
v) Transmission functions operated along the path, for example number of QoS mappings incurred, eg: UMTS, DS, MPLS is more complex than a mapping set of UMTS to fixed and pre-defined MPLS profiles.

Embodiments of the invention may be used in the construction of a tool platform having a database which includes all network elements as multi-layer representations that may be grouped into regions such as MSC parented, or RNC parented, LA, RA, URA mobility parented. Additionally the regions would be able to be operated with background loads representing each region for some optimization tasks.

Various modifications made to the embodiments described above without departing from the scope of the present invention. For example although the present invention has been illustrated with reference to modeling a mobile radio network such as GPRS or UMTS, it will be appreciated that the other telecommunications system can be modeled in this way such as a wireless access network Wi-Fi or indeed any fixed internet protocol broadband or other telecommunications network. Various further aspects and features of the present invention are defined in the appended claims.

The invention claimed is:

1. A method of configuring a telecommunications network, the telecommunications network including a plurality of network elements, the network elements being interconnected to provide a facility for communicating between user terminals connected to the telecommunications network, the method comprising:
generating a model of each of one or more of the network elements of the telecommunications network, the model including a representation of an amount of network services available to that network element, wherein each of the models of the one or more network elements includes a representation of a calculation of a transmission bandwidth available for communicating data to and from the first network element to which the second network element is connected;
defining a background node element indicative of an effect of a representation of communications traffic according to a traffic profile, the traffic profile representing a number and type of user services which are required to be supported by the telecommunications network;
determining an amount of the network services of the model consumed by the traffic profile on a model of a first network element of the telecommunications system;
modelling the communication of the traffic profile via the telecommunications network, by propagating the effect of the background node element to a model of a second network element to which the first network element is connected, to determine an effect of the traffic profile on an amount of the network services consumed;
based on the determined amount of network services consumed, determining a demanded transmission bandwidth required to support the traffic profile in accordance with an amount of data communicated between the first modelled network element and the second modelled network element connected to the first modelled element, thereby propagating the traffic profile from the modelled network element to which the network element is connected;
configuring the telecommunications network in accordance with the evaluated effect on the model;
mapping the traffic profile to a loading of network services on an interface between the first and the second modelled network element unto a loading caused by communicating data on the first network element in the telecommunications network,
probing the interface between the first and the second network elements to identify an amount of an available network services consumed by the traffic loading on the interface, and
validating the determined network services consumed by the models of the first and second network elements with respect to the identified network services consumed by the traffic loading on the interface between the first and second network elements operating in the telecommunications network.

2. A method as claimed in claim 1, wherein the network services modelled for the first modelled network element include a representation of a number and a type of available communications resources available to the first modelled network element, and the propagating the background node element to the second modelled network element includes determining an amount of the communications resources consumed by the traffic profile in accordance with the number and type of user communications services represented by the traffic load of the background node element, and the type of available communications resources provided by said first network element.

3. A method of configuring a telecommunications network as claimed in claim 1, comprising
scaling the network services consumed by the background node element on the first network element based on the validated determined network resources to a model of another of the networks elements on the telecommunications system.

4. A non-transitory computer-readable medium storing instructions, which when loaded on a data processor and executed cause a computer to perform the method according to claim 1.

5. An apparatus for configuring a telecommunications network, the telecommunications network including a plurality of network elements, the network elements being interconnected to provide a facility for communicating between user terminals connected to the telecommunications network, the apparatus comprising a data processor, which is arranged in operation
to generate a model of each of one or more of the network elements of the telecommunications network, the model including a representation of an amount of network services available to that network element,
to define a background node element indicative of an effect of a representation of communications traffic according to a traffic profile, the traffic profile representing a number and type of user services which are required to be supported by the telecommunications network,
to determine an amount of the network services of the model consumed by the traffic profile on a model of a first network element of the telecommunications system,
to model the communication of the traffic profile via the telecommunications network, by propagating the effect of the background node element to a model of a second network element to which the first network element is connected, to determine an effect of the traffic profile on an amount of the network services consumed, and
an operation and maintenance centre which is arranged to configure the telecommunications network in accordance with the evaluated effect on the model,
wherein each of the models of the one or more network elements includes a representation of a calculation of a transmission bandwidth available for communicating data to and from the first network element to which the second network element is connected, and the data processor is arranged
to determine, based on the determined amount of network services consumed, a demanded transmission bandwidth required to support the traffic profile in accordance with an amount of data communicated between the first modelled network element and the second modelled network element connected to the first modelled element, thereby propagating the traffic profile from the modelled network element to which the network element is connected;
the apparatus including a probe for analysing data communicated via the interface between the first and the second network elements to identify an amount of an available network services consumed by the traffic loading on the interface, and the data processor is arranged to map the traffic profile to a loading of network services on an interface between the first and the second modelled network element into a loading caused by communicating data on the first network element in the telecommunications network, and to validate the determined network services consumed by the models of the first and second network elements with respect to the identified network services consumed by the traffic loading on the interface between the first and second network elements operating in the telecommunications network.

6. An apparatus as claimed in claim 5, wherein the network services modelled for the first modelled network element include a representation of a number and a type of available communications resources available to the modelled network element, and the data processor is arranged to propagate the background node element to the second modelled network element by determining an amount of the communications resources consumed by the traffic profile in accordance with the number and type of user communications services represented to the traffic load of the background node element, and the type of available communications resources provided by said first network element.

7. An apparatus as claimed in claim 5, wherein the data processor is arranged to scale the network services consumed by the background node element on the first network element based on the validated network services consumed to a model of another of the networks elements on the telecommunications system.

8. An apparatus for configuring a telecommunications network, the telecommunications network including a plurality of network elements, the network elements being interconnected to provide a facility for communicating between user terminals connected to the telecommunications network, the apparatus comprising means for generating a model of each of one or more of the network elements of the telecommunications network, the model including a representation of an amount of network services available to that network element, means for defining a background node element indicative of an effect of a representation of communications traffic according to a traffic profile, the traffic profile representing a number and type of user services which are required to be supported by the telecommunications network, means for determining an amount of the network services of the model consumed by the traffic profile on a model of a first network element of the telecommunications system, means for modelling the communication of the traffic profile via the telecommunications network, by propagating the effect of the background node generator to a model of a second network element to which the first network element is connected, to determine an effect of the traffic profile on an amount of the network services consumed, means for configuring the telecommunications network in accordance with the evaluated effect on the model, wherein each of the models of the one or more network elements includes a representation of a calculation of a transmission bandwidth available for communicating data to and from the first network element to which the second network element is connected, and the data processor is arranged means for determining, based on the determined amount of network services consumed, a demanded transmission bandwidth required to support the traffic profile in accordance with an amount of data communicated between the first modelled network element and the second modelled network element connected to the first modelled element, thereby propagating the traffic profile from the modelled network element to which the network element is connected;

means for mapping the traffic profile to a loading of network services on an interface between the first and the second modelled network element unto a loading caused by communicating data on the first network element in the telecommunications network, means for probing the interface between the first and the second network elements to identify an amount of an available network services consumed by the traffic loading on the interface, and means for validating the determined network services consumed by the models of the first and second network elements with respect to the identified network services consumed by the traffic loading on the interface between the first and second network elements operating in the telecommunications network.

9. An apparatus for configuring a telecommunications network, the telecommunications network including a plurality of network elements, the network elements being interconnected to provide a facility for communicating between user terminals connected to the telecommunications network, the apparatus comprising a generating module for generating a model of each of one or more of the network elements of the telecommunications network, the model including a representation of an amount of network services available to that network element, a defining module for defining a background node element indicative of an effect of a representation of communications traffic according to a traffic profile, the traffic profile representing a number and type of user services which are required to be supported by the telecommunications network, a first determining module for determining an amount of the network services of the model consumed by the traffic profile on a model of a first network element of the telecommunications system, a modelling module for modelling the communication of the traffic profile via the telecommunications network, by propagating the effect of the background node generator to a model of a second network element to which the first network element is connected, to determine an effect of the traffic profile on an amount of the network services consumed, a configuring module for configuring the telecommunications network in accordance with the evaluated effect on the model, wherein each of the models of the one or more network elements includes a representation of a calculation of a transmission bandwidth available for communicating data to and from the first network element to which the second network element is connected, and the data processor is arranged a second determining module for determining, based on the determined amount of network services consumed, a demanded transmission bandwidth required to support the traffic profile in accordance with an amount of data communicated between the first modelled network element and the second modelled network element connected to the first modelled element, thereby propagating the traffic profile from the modelled network element to which the network element is connected;

a mapping module for mapping the traffic profile to a loading of network services on an interface between the first and the second modelled network element unto a loading caused by communicating data on the first network element in the telecommunications network, a probing module for probing the interface between the first and the second network elements to identify an amount of an available network services consumed by the traffic loading on the interface, and a validating module for validating the determined network services consumed by the models of the first and second network elements with respect to the identified network services consumed by the traffic loading on the interface between the first and second network elements operating in the telecommunications network.

* * * * *